(12) United States Patent
Chen et al.

(10) Patent No.: US 12,309,364 B2
(45) Date of Patent: May 20, 2025

(54) SYSTEM AND METHOD FOR APPLYING NEURAL NETWORK BASED SAMPLE ADAPTIVE OFFSET FOR VIDEO CODING

(71) Applicant: Beijing Dajia Internet Information Technology Co., Ltd., Beijing (CN)

(72) Inventors: Wei Chen, San Diego, CA (US); Xiaoyu Xiu, San Diego, CA (US); Che-Wei Kuo, Beijing (CN); Yi-Wen Chen, San Diego, CA (US); Hong-Jheng Jhu, Beijing (CN); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 281 days.

(21) Appl. No.: 17/692,298

(22) Filed: Mar. 11, 2022

(65) Prior Publication Data
US 2022/0337824 A1    Oct. 20, 2022

Related U.S. Application Data

(60) Provisional application No. 63/171,979, filed on Apr. 7, 2021.

(51) Int. Cl.
*H04N 19/117* (2014.01)
*H04N 19/14* (2014.01)
(Continued)

(52) U.S. Cl.
CPC ........... *H04N 19/117* (2014.11); *H04N 19/14* (2014.11); *H04N 19/176* (2014.11); *H04N 19/42* (2014.11); *H04N 19/82* (2014.11); *H04N 19/159* (2014.11)

(58) Field of Classification Search
None
See application file for complete search history.

(56) References Cited

U.S. PATENT DOCUMENTS

2011/0305274 A1*  12/2011  Fu ................... H04N 19/61
                                           375/E7.126
2018/0249158 A1    8/2018  Huang et al.
(Continued)

FOREIGN PATENT DOCUMENTS

CN    111052740 A    4/2020
CN    111937392 A    11/2020
(Continued)

OTHER PUBLICATIONS

Sugio et al., "AHG6: A threshold for SAO edge offset," Joint Collaborative Team on Video Coding (JCT-VC) of ITU-T SG 16 WP 3 and ISO/IEC JTC 1/SC 29/WG 11, 10th Meeting: Stockholm, SE (Year: 2012).*
(Continued)

Primary Examiner — Dave Czekaj
Assistant Examiner — Shanika M Brumfield
(74) Attorney, Agent, or Firm — Bayes PLLC

(57) ABSTRACT

Embodiments of the disclosure provide systems and methods for applying neural network based sample adaptive offset (SAO) for video coding. The method may include classifying reconstructed samples of a reconstructed block into a set of categories based on neural network based in-loop filtering (NNLF). The reconstructed block includes a reconstructed version of a video block of a video frame from a video. The method may further include determining a set of offsets for the set of categories based on the classification of the reconstructed samples. The method may additionally include, responsive to the NNLF being performed on the reconstructed block, performing SAO filtering on the NNLF filtered samples based on the set of offsets.

(Continued)

The NNLF filtered samples are generated from the reconstructed samples using the NNLF.

18 Claims, 16 Drawing Sheets

(51) Int. Cl.
  *H04N 19/176* (2014.01)
  *H04N 19/42* (2014.01)
  *H04N 19/82* (2014.01)
  *H04N 19/159* (2014.01)

(56) References Cited

U.S. PATENT DOCUMENTS

| | | | | |
|---|---|---|---|---|
| 2019/0273948 | A1* | 9/2019 | Yin | G06N 3/045 |
| 2020/0120340 | A1* | 4/2020 | Park | H04N 19/65 |
| 2021/0012537 | A1* | 1/2021 | Xu | H04N 19/136 |
| 2021/0329286 | A1* | 10/2021 | Wang | H04N 19/82 |
| 2021/0368211 | A1* | 11/2021 | Wan | H04N 19/117 |
| 2022/0109890 | A1* | 4/2022 | Li | H04N 19/85 |
| 2022/0191553 | A1* | 6/2022 | Auyeung | H04N 19/395 |
| 2022/0295116 | A1* | 9/2022 | Ma | H04N 19/117 |
| 2022/0321919 | A1* | 10/2022 | Deshpande | H04N 19/70 |
| 2023/0188713 | A1* | 6/2023 | Bordes | H04N 19/117 |
| | | | | 375/240.02 |

FOREIGN PATENT DOCUMENTS

| | | | |
|---|---|---|---|
| WO | 2020002117 A2 | 1/2020 | |
| WO | 2020062074 A1 | 4/2020 | |
| WO | WO-2022211693 A1 * | 10/2022 | H04N 19/117 |

OTHER PUBLICATIONS

First Office Action in related Chinese Application No. 202210359096.5 dated Jan. 20, 2025 (16 pages).

P. Bordes, F. Galpin, T. Dumas, P. Nikitin, AHG11: Revisiting SAO In-loop Filter with Neural Networks, Joint Video Experts Team (JVET) of ITU-T SG 16 WP 3 and ISO/IEC JTC 1/SC 29 21st Meeting, by teleconference, Jan. 6-15, 2021, JVET-U0077-v1.

* cited by examiner

SAMPLE EDGEIDX CATEGORIES IN SAO EDGE CLASSES

| EdgeIdx | Condition | Meaning |
|---|---|---|
| 0 | Cases not listed below | Monotonic area |
| 1 | $p < n_0$ and $p < n_1$ | Local min |
| 2 | $p < n_0$ and $p = n_1$ or $p < n_1$ and $p = n_0$ | Edge |
| 3 | $p > n_0$ and $p = n_1$ or $p > n_1$ and $p = n_0$ | Edge |
| 4 | $p > n_0$ and $p > n_1$ | Local max |

SYSTEM AND METHOD FOR APPLYING NEURAL NETWORK BASED SAMPLE ADAPTIVE OFFSET FOR VIDEO CODING

CROSS-REFERENCE TO RELATED APPLICATION

This application is based upon and claims priority to U.S. Provisional Application No. 63/171,979 filed Apr. 7, 2021, the content thereof is incorporated herein by reference in its entirety.

TECHNICAL FIELD

This application is related to video coding and compression. More specifically, this application relates to systems and methods for applying neural network based Sample Adaptive Offset (SAO) for video coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. For example, video coding standards include Versatile Video Coding (VVC), Joint Exploration test Model (JEM), High-Efficiency Video Coding (HEVC/H.265), Advanced Video Coding (AVC/H.264), Moving Picture Expert Group (MPEG) coding, or the like. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

SUMMARY

Embodiments of the present disclosure provide a method for applying neural network based sample adaptive offset (SAO) for video coding. The method may include classifying, by a video processor, reconstructed samples of a reconstructed block into a set of categories based on neural network based in-loop filtering (NNLF). The reconstructed block includes a reconstructed version of a video block of a video frame from a video. The method may further include determining, by the video processor, a set of offsets for the set of categories based on the classification of the reconstructed samples. The method may additionally include, responsive to the NNLF being performed on the reconstructed block, performing, by the video processor, SAO filtering on NNLF filtered samples based on the set of offsets. The NNLF filtered samples are generated from the reconstructed samples using the NNLF.

Embodiments of the present disclosure also provide a system for applying neural network based SAO for video coding. The system may include a memory and a video processor. The memory may be configured to store at least one video frame of a video. The video frame includes at least one video block. The video processor may be configured to classify reconstructed samples of a reconstructed block into a set of categories based on NNLF. The reconstructed block includes a reconstructed version of the video block. The video processor may further be configured to determine a set of offsets for the set of categories based on the classification of the reconstructed samples. The video processor may also be configured to, responsive to the NNLF being performed on the reconstructed block, perform SAO filtering on the NNLF filtered samples based on the set of offsets. The NNLF filtered samples are generated from the reconstructed samples using the NNLF.

Embodiments of the present disclosure also provide a non-transitory computer-readable storage medium having stored therein instructions which, when executed by a video processor, cause the video processor to perform a method for applying neural network based SAO for video coding. The method may include classifying reconstructed samples of a reconstructed block into a set of categories based on NNLF. The reconstructed block includes a reconstructed version of a video block of a video frame from a video. The method may further include determining a set of offsets for the set of categories based on the classification of the reconstructed samples. The method may also include, responsive to the NNLF being performed on the reconstructed block, performing SAO filtering on the NNLF filtered samples based on the set of offsets. The NNLF filtered samples are generated from the reconstructed samples using the NNLF. The method may also include generating a bitstream including offset related information based on the set of offsets for the set of categories. The bitstream is stored in the non-transitory computer-readable storage medium.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 8A is a graphical representation illustrating gradient patterns used in SAO in accordance with some examples.

FIG. 8B is a graphical representation illustrating sample edge index categories in SAO edge classes in accordance with some examples.

DETAILED DESCRIPTION

Figure 1:
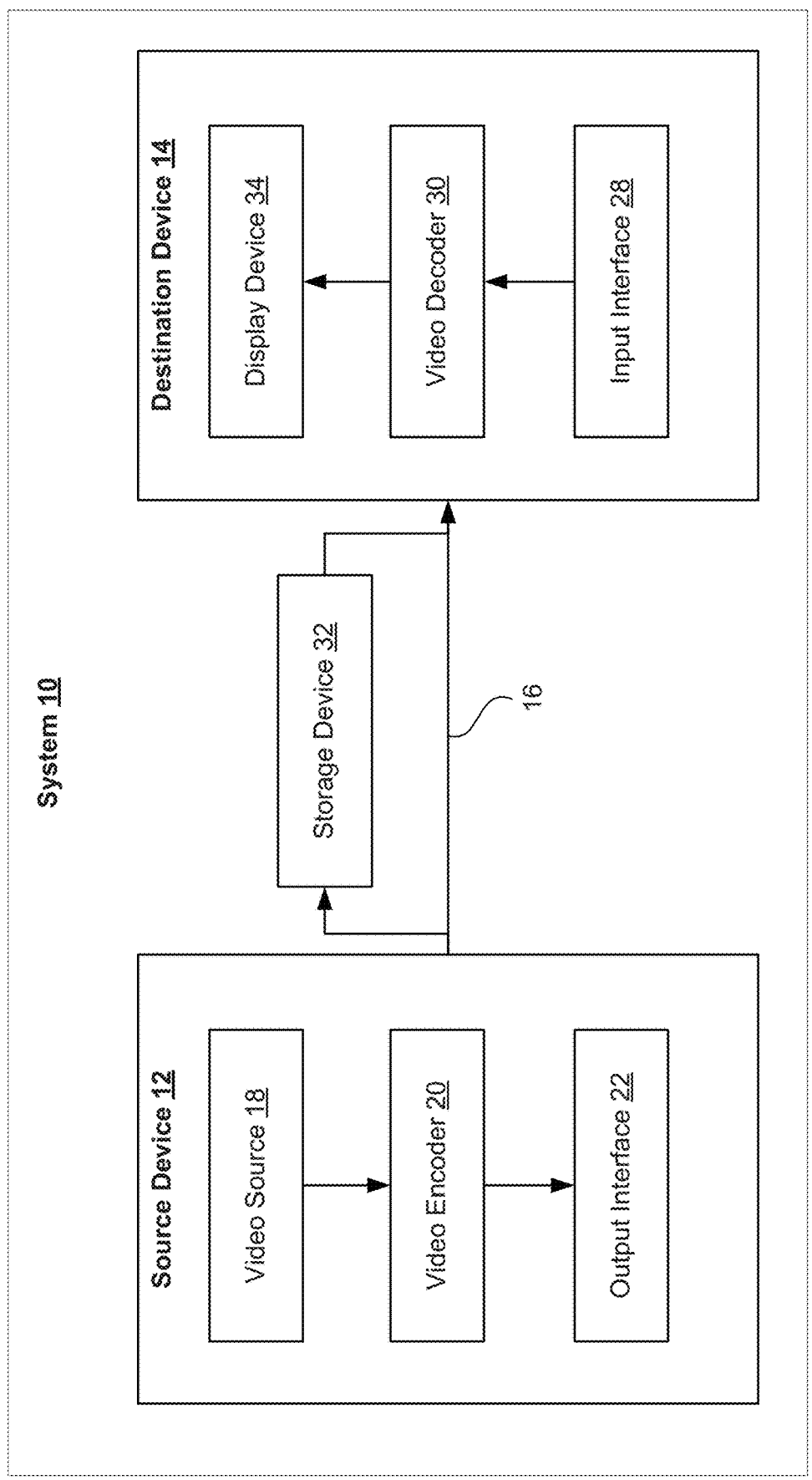
FIG. 1 is a block diagram illustrating an exemplary system for encoding and decoding video blocks in accordance with some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

It should be illustrated that the terms "first," "second," and the like used in the description, claims of the present disclosure, and the accompanying drawings are used to distinguish objects, and not used to describe any specific order or sequence. It should be understood that the data used in this way may be interchanged under an appropriate condition, such that the embodiments of the present disclosure described herein may be implemented in orders besides those shown in the accompanying drawings or described in the present disclosure.

Like the High Efficiency Video Coding (HEVC) standard, the VVC standard may be built upon a block-based hybrid video coding framework. The hybrid video coding framework may include an encoding system for encoding the video data at a transmitting side and a decoding system for decoding the video data at a receiving side. Each of the encoding system and the decoding system may include an SAO filter. For example, in the current HEVC, VVC, AVS standards, an SAO filter may be applied to classify reconstructed samples into different categories, and a corresponding offset is added to each category of samples to minimize the sample distortion. The sample intensity and edge properties can be used for sample classification. Therefore, the performance of the SAO may rely on how its classification behaves.

SAO filtering may be a process that modifies reconstructed samples by conditionally adding a respective offset value to each reconstructed sample. SAO filtering may be applied after a deblocking filter. The offset value may be determined based on values in look-up tables transmitted by an encoder. In some examples, SAO filtering can be performed on a region basis based on a filtering type. The filtering type may be selected per coding tree block (CTB) using a syntax element (e.g., sao-type-idx). A value of "0" for sao-type-idx indicates that the SAO filter is not applied to the CTB, and values "1" and "2" for the sao-type-idx signal indicate the use of a band offset filtering type and an edge offset filtering type, respectively.

In the band offset mode specified by sao-type-idx=1, a selected offset value directly depends on a sample amplitude. In this mode, the full sample amplitude range is uniformly split into 32 segments called bands, and sample values belonging to four of these 32 bands (which are consecutive within the 32 bands) are modified by adding transmitted values denoted as band offsets. The band offsets can be positive or negative. A reason for using four consecutive bands is that in the smooth areas where banding artifacts can appear, the sample amplitudes in a CTB tend to be concentrated in only a few of the bands. In addition, the design choice of using four offsets is unified with an edge offset mode of operation which also uses four offset values.

In the edge offset mode specified by sao-type-idx=2, a syntax element sao-eo-class with values from 0 to 3 signals whether a horizontal, vertical, or one of two diagonal gradient directions is used for the edge offset classification in the CTB. FIG. 8A depicts four gradient patterns used for the respective sao-eo-class in this mode. For example, with reference to FIG. 8A, a sample labeled with "p" indicates a center sample to be considered. Two samples labeled with "n0" and "n1" specify two neighboring samples along a horizontal gradient pattern (e.g., sao-eo-class=0) as shown in a graph (a), a vertical gradient pattern (e.g., sao-eo-class=1) as shown in a graph (b), a 1350 diagonal gradient pattern (e.g., sao-eo-class=2) as shown in a graph (c), and a 450 gradient pattern (e.g., sao-eo-class=3) as shown in a graph (d).

FIG. 8B depicts five Edge Index (EdgeIdx) categories (e.g., 0, 1, 2, 3, 4) to which the samples can be classified into. Each sample in the CTB is classified into one of the five EdgeIdx categories by comparing its sample value "p" located at the center sample position with values "n0" and "n1" of two samples located at neighboring positions. This classification can be performed for each sample based on reconstructed sample values, so that no additional signaling is required for the EdgeIdx classification. Depending on the EdgeIdx category at the sample position and for each of the EdgeIdx categories from 1 to 4, an offset value from a transmitted look-up table is added to the sample value. The offset values for the categories 1 and 2 are positive, and the offset values for the categories 3 and 4 are negative. Thus, the SAO filter generally has a smoothing effect in the edge offset mode.

Thus, for SAO types 1 and 2 (e.g., sao-type-idx=1 or 2), a total of four amplitude offset values are transmitted to a decoder for each CTB. For SAO type 1 (e.g., sao-type-idx=1), a sign of an offset value is also encoded. The offset values and related syntax elements (such as sao-type-idx and sao-eo-class) are determined by the encoder using criteria that optimize rate-distortion performance. The SAO parameters can be indicated to be inherited from the left or above CTB using a merge flag to make the signaling efficient. As a result, SAO filtering can include a nonlinear filtering operation which allows additional refinement of the reconstructed samples, and can enhance the signal representation in both smooth areas and around edges.

Consistent with the present disclosure, NNLF may be applied in systems and methods disclosed herein for applying neural network based SAO in video coding, so as to improve video coding by learning the nonlinear mapping relationship between original images and reconstructed images. This nonlinear mapping relationship may be a function of various factors, such as the current sample intensity value, collocated samples, and neighboring samples within a specific receptive field, which may be different at different filtered sample locations. As a result, the filtering process at each sample may be above or under desired strength. From a global feature perspective, all the samples within a picture or a block may be over or under filtered, leading to a misalignment of average intensity between the filtered image/block and original image/block. From a local feature perspective, the samples located at texture edges may be further over or under filtered, due to unbalanced filtering strength between high frequency image contents (e.g., edges) and low frequency contents (e.g., flat area). Consistent with the present disclosure, the systems and methods disclosed herein can improve the NNLF from both the global feature perspective and the local feature perspective and can also explore other exemplary benefits of neural networks.

For example, the feature extraction capability of the neural network can be utilized in the systems and methods disclosed herein. Specifically, when neural network based filtering is performed, texture details such as edges in a filtered image can be extracted. Therefore, the neural network based filtering can be used in classification methods for SAO (such as a texture edge classification and/or a mean intensity classification described below).

In another example, due to limited resources such as limited training time, limited training data diversity, and limited neural network capacity, a neural network model may be overfitting or underfitting the training data at a training stage. Also, at an inference stage, the generalization capability of a trained neural network model may fail to meet expectations. As a result, the neural network based filtering performed at each image level (or, block level) may be above or under desired strength. To compensate the unbalanced filtering strength, an image-level (or block-level) offset can be applied in SAO in the systems and methods disclosed herein.

FIG. 1 is a block diagram illustrating an exemplary system 10 for encoding and decoding video blocks in parallel in accordance with some implementations of the present disclosure. As shown in FIG. 1, the system 10 includes a source device 12 that generates and encodes video data to be decoded at a later time by a destination device 14. The source device 12 and the destination device 14 may include any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may include any type of communication medium or device capable of forwarding the encoded video data from the source device 12 to the destination device 14. In one example, the link 16 may include a communication medium to enable the source device 12 to transmit the encoded video data directly to the destination device 14 in real time. The encoded video data may be modulated according to a communication standard, such as a wireless communication protocol, and transmitted to the destination device 14. The communication medium may include any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may store the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or any combination thereof that is suitable for accessing encoded video data stored on a file server. The transmission of the encoded video data from the storage device 32 may be a streaming transmission, a download transmission, or a combination of both.

As shown in FIG. 1, the source device 12 includes a video source 18, a video encoder 20, and the output interface 22. The video source 18 may include a source such as a video capturing device, e.g., a video camera, a video archive containing previously captured video, a video feeding interface to receive video data from a video content provider, and/or a computer graphics system for generating computer graphics data as the source video, or a combination of such sources. As one example, if the video source 18 is a video camera of a security surveillance system, the source device 12 and the destination device 14 may include camera phones or video phones. However, the implementations described in the present disclosure may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data for a user, and may include any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present disclosure is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Figure 2:
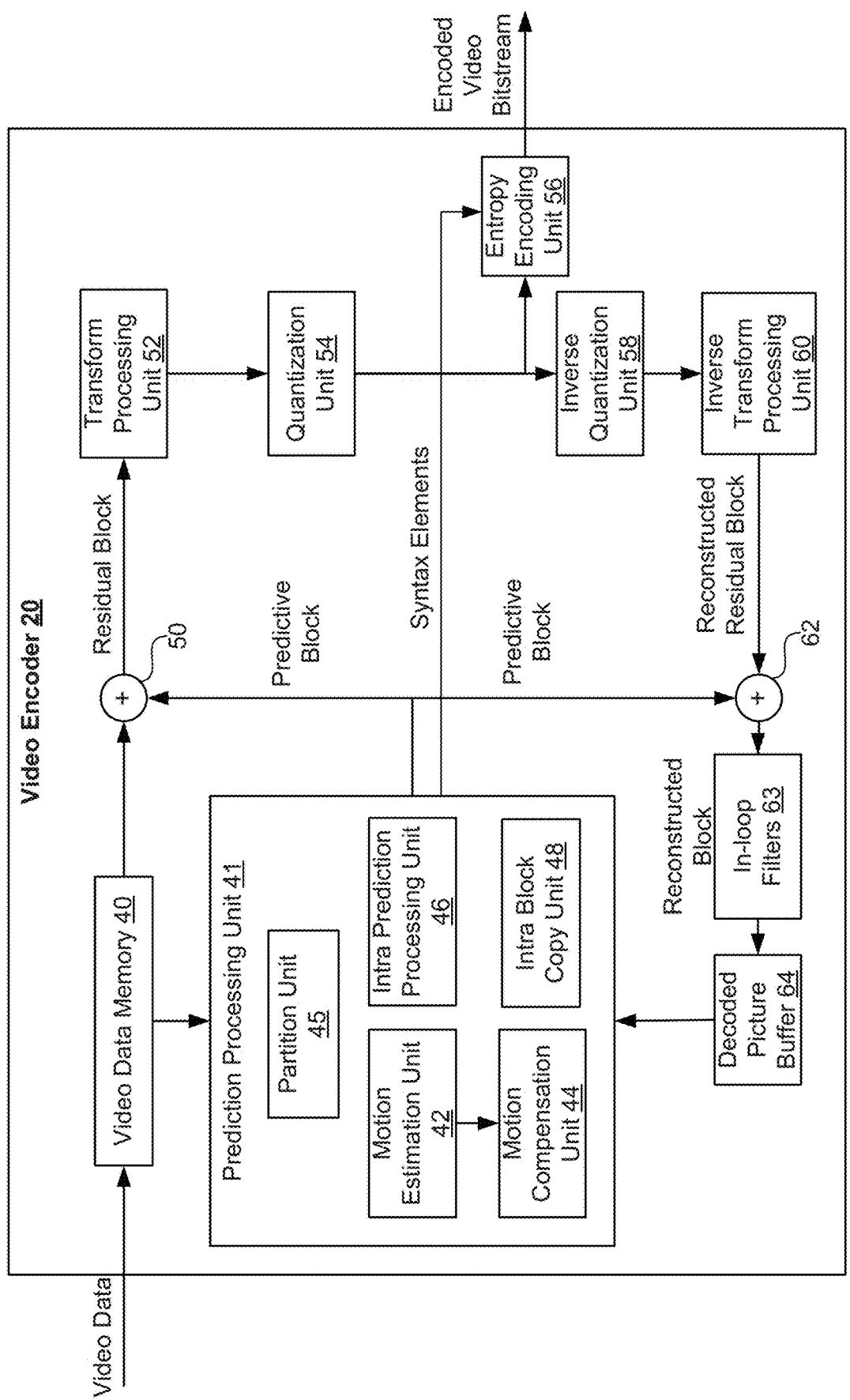
FIG. 2 is a block diagram illustrating an exemplary video encoder in accordance with some implementations of the present disclosure.

FIG. 2 is a block diagram illustrating an exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 2, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove block artifacts from reconstructed video data. Another in-loop filter, such as an SAO filter and/or Adaptive in-Loop Filter (ALF), may also be used in addition to the deblocking filter to filter an output of the summer 62. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 1. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 2, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning, Triple-Tree (TT) partitioning or any combination thereof. It should be noted that the term "block" or "video block" as used herein may be a portion, in particular a rectangular (square or non-square) portion, of a frame or a picture. With reference to, for example, HEVC and VVC, the block or video block may be or correspond to a Coding Tree Unit (CTU), a CU, a Prediction Unit (PU), or a Transform Unit (TU), and/or may be or correspond to a corresponding block, e.g., a Coding Tree Block (CTB), a Coding Block (CB), a Prediction Block (PB), or a Transform Block (TB). Alternatively or additionally, the block or video block may be or correspond to a sub-block of a CTB, a CB, a PB, a TB, etc.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block (e.g., a predictive block) to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference video frame, according to a predetermined pattern within a sequence of video frames. Motion estimation, performed by the motion estimation unit 42, may be a process of generating motion vectors, which may estimate motion for video blocks. A motion vector, for example, may indicate the displacement of a video block within a current video frame or picture relative to a predictive block within a reference frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vectors.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual block of pixel difference values by subtracting pixel values of the predictive block provided by the motion compensation unit 44 from the pixel values of the current video block being coded. The pixel difference values forming the residual block may include luma or chroma difference components or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. It is noted that the motion estimation unit 42 and the motion compensation unit 44 may be integrated together, which are illustrated separately for conceptual purposes in FIG. 2.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or from a different frame according to inter prediction, the video encoder 20 may form a residual block by subtracting pixel values of the predictive block from the pixel values of the current video block being coded, forming pixel difference values. The pixel difference values forming the residual block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. For example, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in a bitstream.

After the prediction processing unit 41 determines the predictive block for the current video block via either inter prediction or intra prediction, the summer 50 forms a residual block by subtracting the predictive block from the current video block. The residual video data in the residual block may be included in one or more TUs and is provided to the transform processing unit 52. The transform processing unit 52 transforms the residual video data into transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 may use an entropy encoding technique to encode the quantized transform coefficients into a video bitstream, e.g., using Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding, or another entropy encoding methodology or technique. The encoded bitstream may then be transmitted to the video decoder 30 as shown in FIG. 1, or archived in the storage device 32 as shown in FIG. 1 for later transmission to or retrieval by the video decoder 30. The entropy encoding unit 56 may also use an entropy encoding technique to encode the motion vectors and the other syntax elements for the current video frame being coded.

The inverse quantization unit 58 and the inverse transform processing unit 60 apply inverse quantization and inverse transformation, respectively, to reconstruct the residual block in the pixel domain for generating a reference block for prediction of other video blocks. A reconstructed residual block may be generated thereof. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42, and the motion compensation unit 44 as a predictive block to inter predict another video block in a subsequent video frame.

Figure 3:
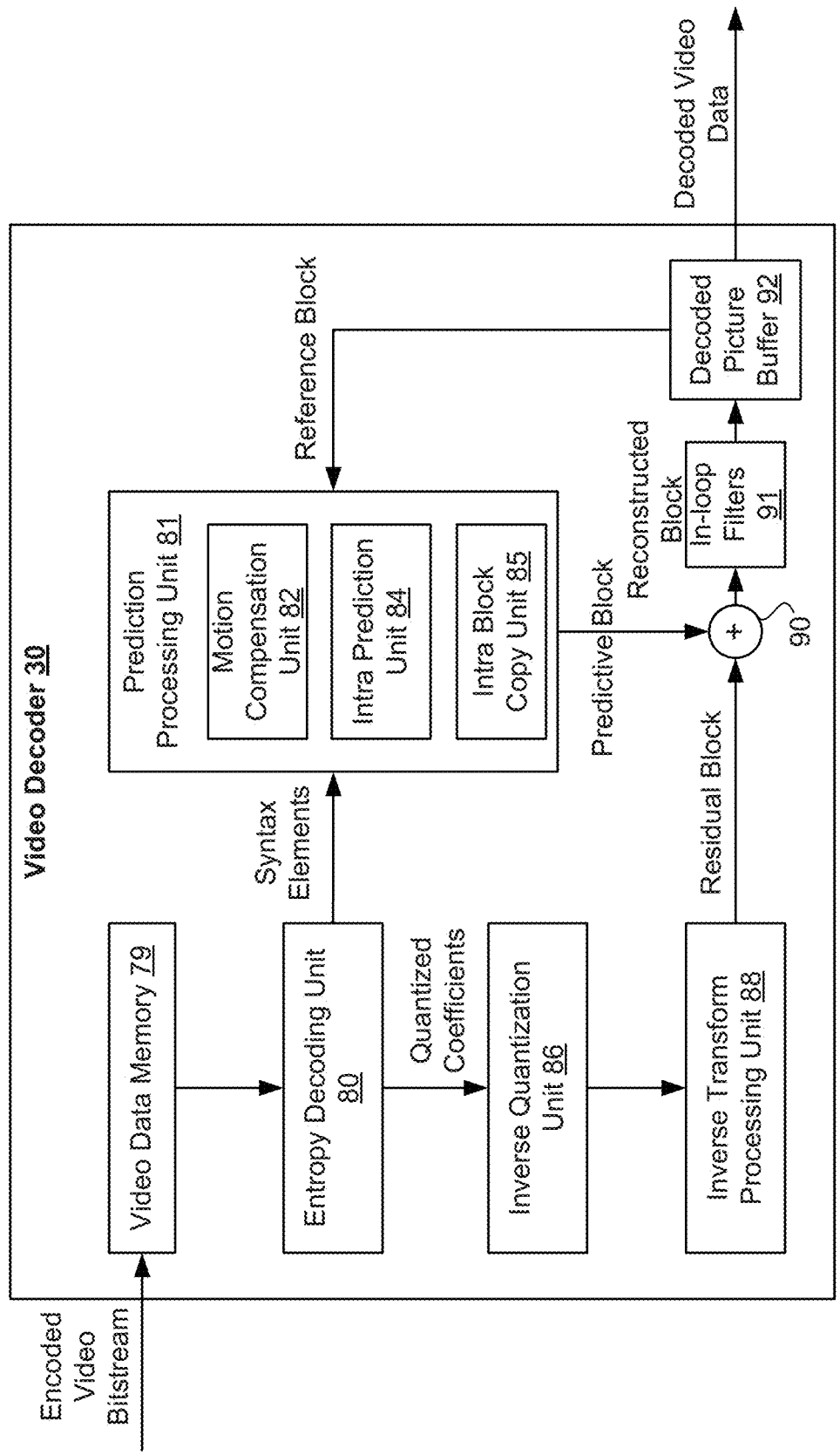
FIG. 3 is a block diagram illustrating an exemplary video decoder in accordance with some implementations of the present disclosure.

FIG. 3 is a block diagram illustrating an exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 2. For example, the motion compensation unit 82 may generate prediction data based on motion vectors received from the entropy decoding unit 80, while the intra prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 3. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 may use an entropy decoding technique to decode the bitstream to obtain quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (e.g., I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, e.g., List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block processed by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inversely quantizes the quantized transform coefficients provided in the bitstream and decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs a decoded video block for the current video block by summing the residual block from the inverse transform processing unit 88 and a corresponding predictive block generated by the motion compensation unit 82 and the intra BC unit 85. The decoded video block may also be referred to as a reconstructed block for the current video block. An in-loop filter 91 such as a deblocking filter, SAO filter, and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 1.

In a typical video coding process (e.g., including a video encoding process and a video decoding process), a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
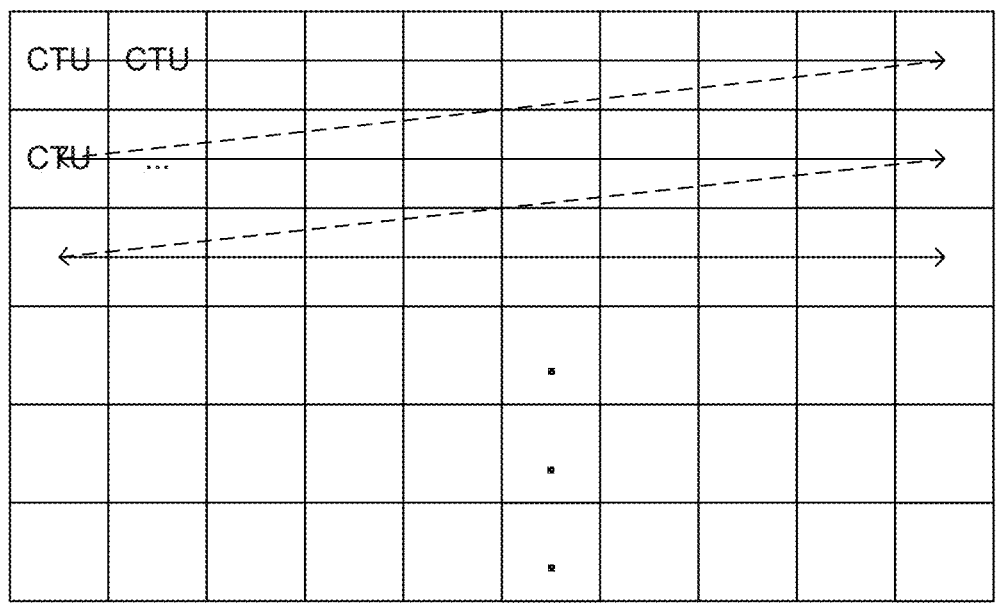
FIGS. 4A through 4E are graphical representations illustrating how a frame is recursively partitioned into multiple video blocks of different sizes and shapes in accordance with some implementations of the present disclosure.
Figure 4B:
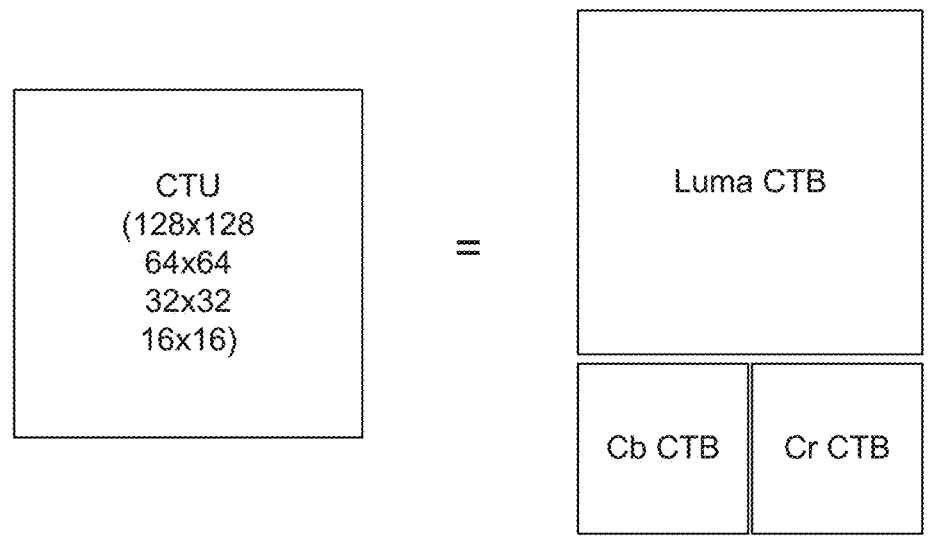

As shown in FIG. 4A, the video encoder 20 (or more specifically the partition unit 45) generates an encoded representation of a frame by first partitioning the frame into a set of CTUs. A video frame may include an integer number of CTUs arranged consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that a CTU in the present disclosure is not necessarily limited to a particular size. As shown in FIG. 4B, each CTU may include one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may include a single coding tree block and syntax elements used to code the samples of the coding tree block. A coding tree block may be an N×N block of samples.

Figure 4C:
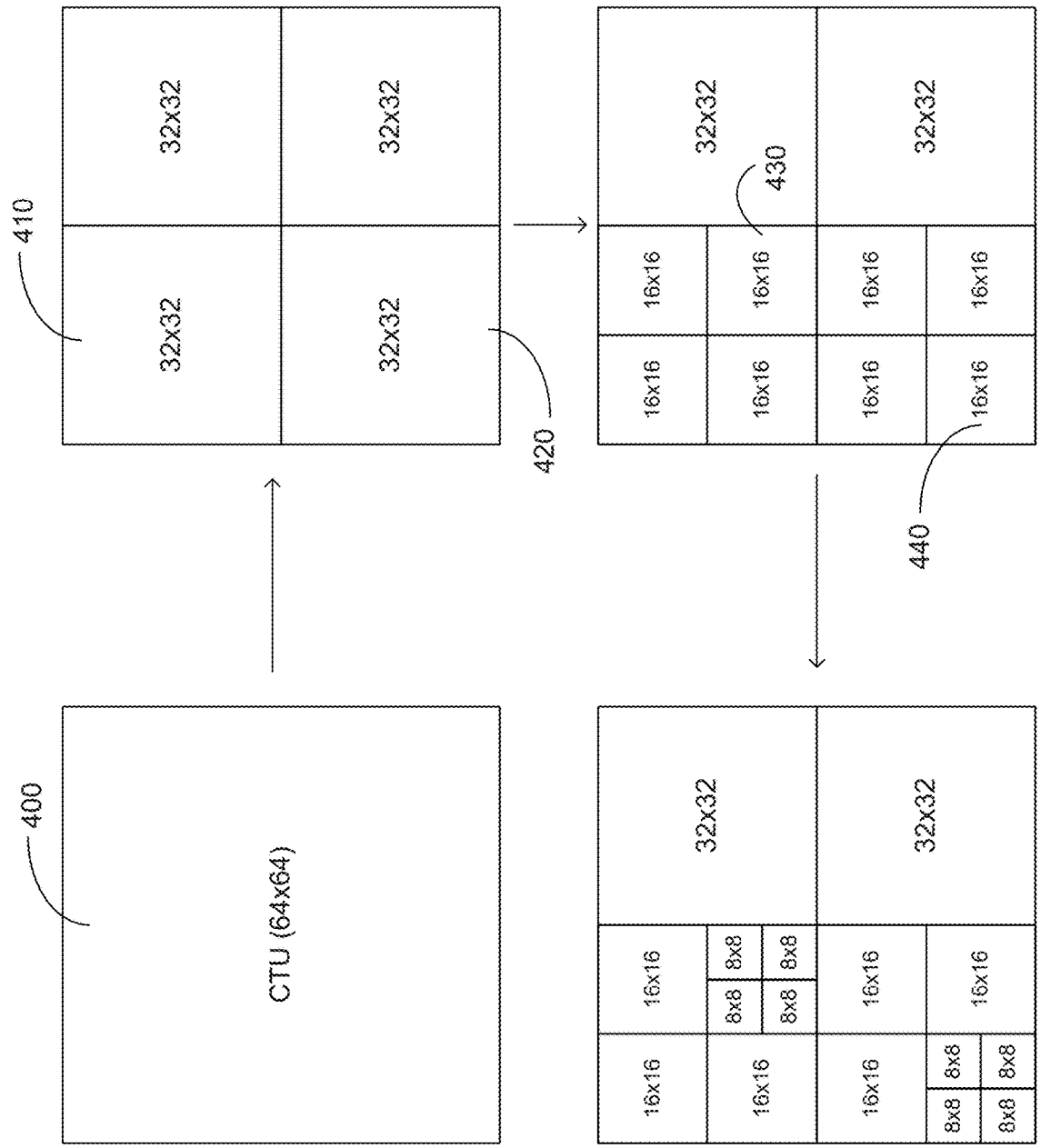
Figure 4D:
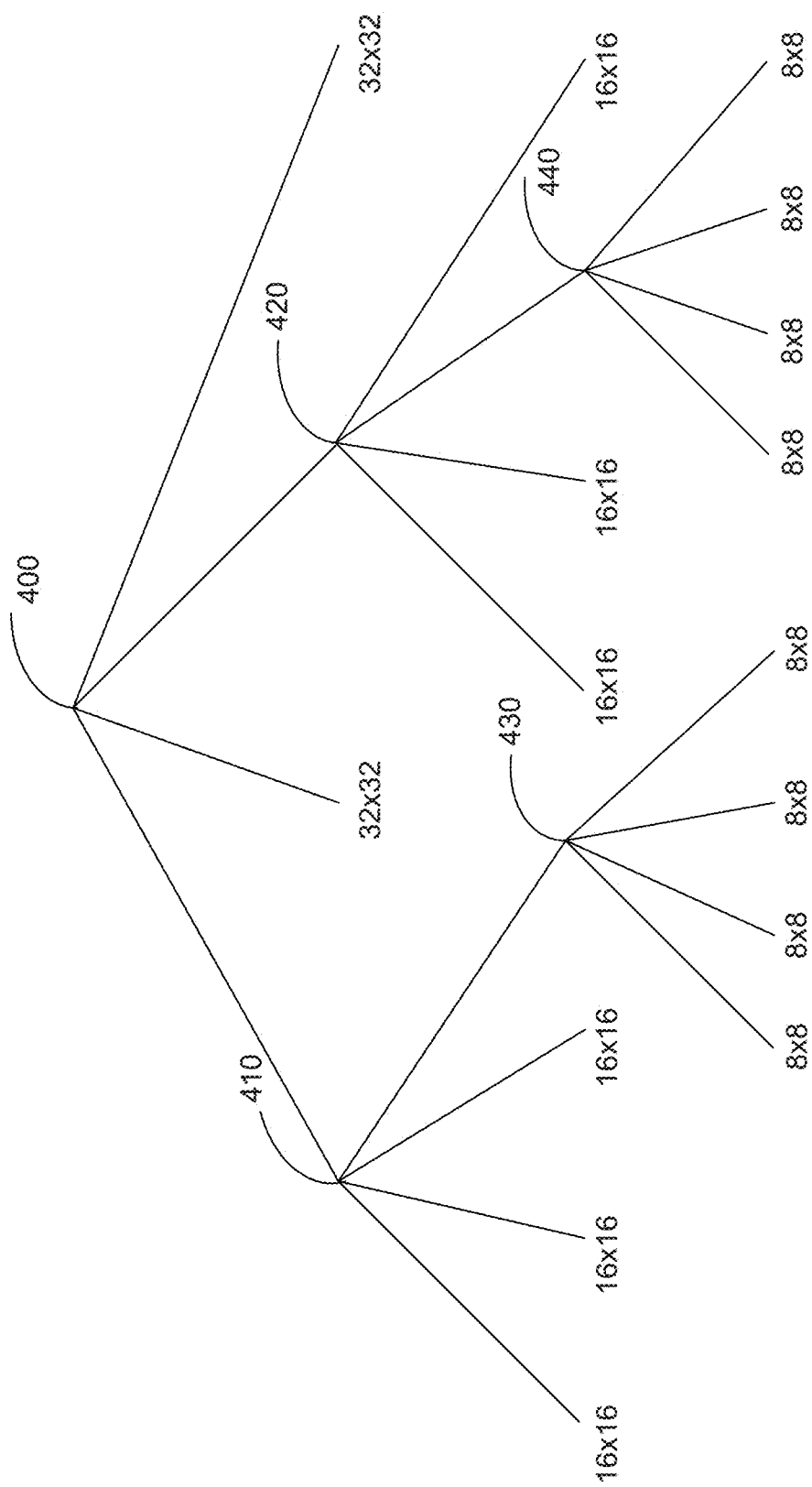
Figure 4E:
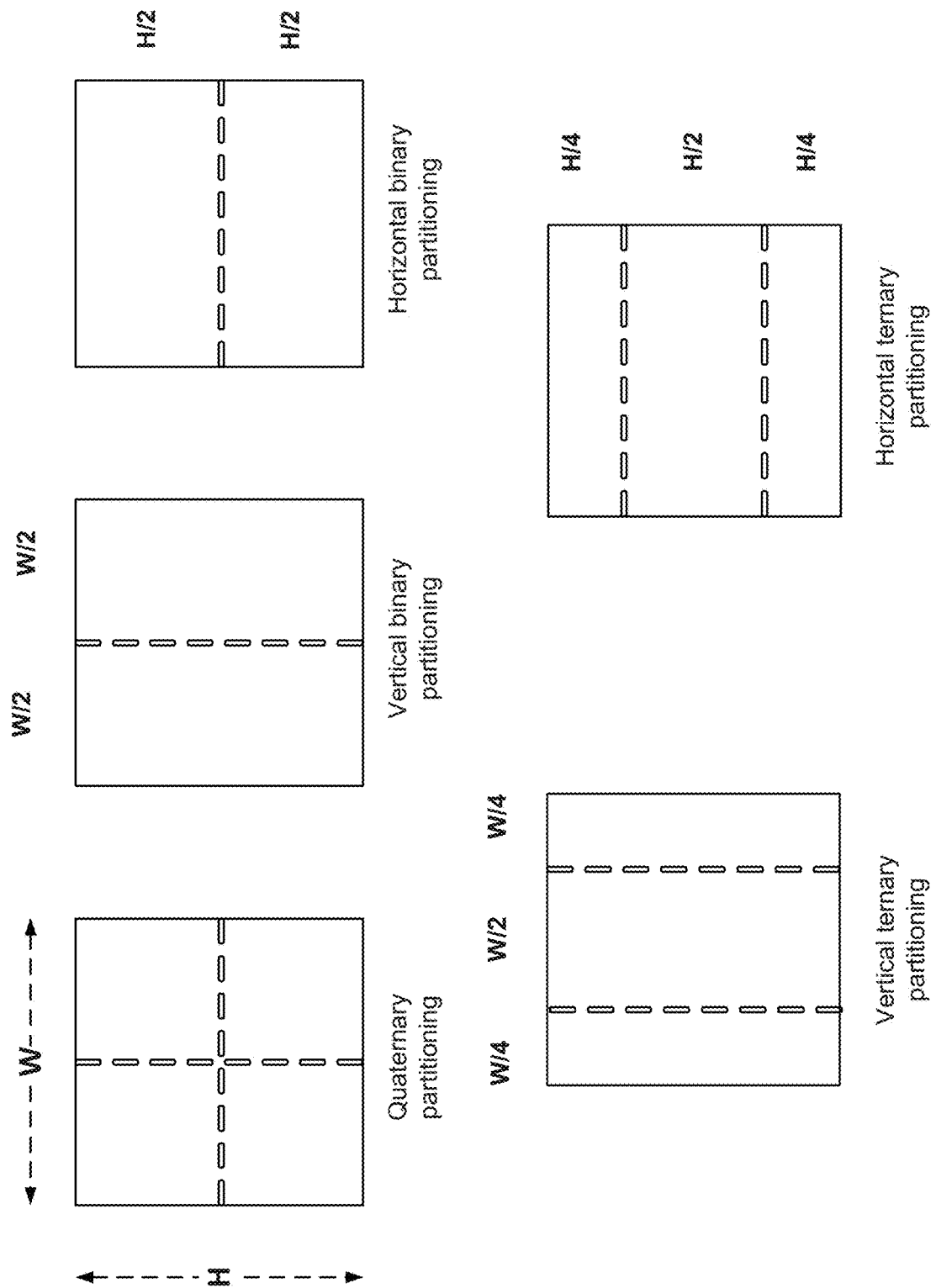

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 4C, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may include a CB of luma samples and two corresponding coding blocks of chroma samples of a frame of the same size, and syntax elements used to code the samples of the coding blocks. In monochrome pictures or pictures having three separate colour planes, a CU may include a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five possible partitioning types of a coding block having a width W and a height H, i.e., quaternary partitioning, horizontal binary partitioning, vertical binary partitioning, horizontal ternary partitioning, and vertical ternary partitioning.

In some implementations, the video encoder 20 may further partition a coding block of a CU into one or more M×N PBs. A PB may include a rectangular (square or non-square) block of samples on which the same prediction, inter or intra, is applied. A PU of a CU may include a PB of luma samples, two corresponding PBs of chroma samples, and syntax elements used to predict the PBs. In monochrome pictures or pictures having three separate color planes, a PU may include a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block, and each sample in the CU's Cr residual block may indicate a difference between a Cr sample in one of the CU's predictive Cr blocks and a corresponding sample in the CU's original Cr coding block.

Furthermore, as illustrated in FIG. 4C, the video encoder 20 may use quad-tree partitioning to decompose the luma, Cb, and Cr residual blocks of a CU into one or more luma, Cb, and Cr transform blocks respectively. A transform block may include a rectangular (square or non-square) block of samples on which the same transform is applied. A TU of a CU may include a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block, or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may apply an entropy encoding technique to encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that form a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that intra block copy (IBC) could be regarded as either intra-frame prediction or a third mode. Between the two modes, inter-frame prediction contributes more to the coding efficiency than intra-frame prediction because of the use of motion vectors for predicting a current video block from a reference video block.

But with the ever-improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding an actual motion vector of the current CU into the video bitstream (e.g., the actual motion vector being determined by the motion estimation unit 42 as described above in connection with FIG. 2), the motion vector predictor of the current CU is subtracted from the actual motion vector of the current CU to produce a Motion Vector Difference (MVD) for the current CU. By doing so, there is no need to encode the motion vector determined by the motion estimation unit 42 for each CU of a frame into the video bitstream, and the amount of data used for representing motion information in the video bitstream can be significantly decreased.

Like the process of choosing a predictive block in a reference frame during inter-frame prediction of a code block, a set of rules can be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30, and an index of the selected motion vector predictor within the motion vector candidate list is sufficient for the video encoder 20 and the video decoder 30 to use the same motion vector predictor within the motion vector candidate list for encoding and decoding the current CU. Thus, only the index of the selected motion vector predictor needs to be sent from the video encoder 20 to the video decoder 30.

Figure 5:
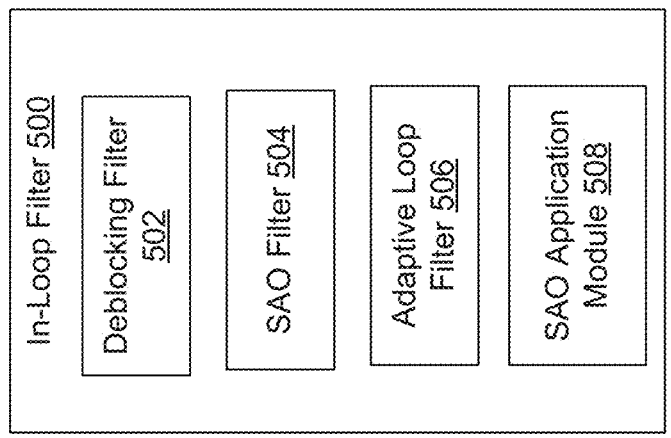
FIG. 5 illustrates a block diagram of an exemplary in-loop filter including an SAO filter in accordance with some implementations of the present disclosure.

FIG. 5 illustrates a block diagram of an exemplary in-loop filter 500 including an SAO filter, in accordance with some implementations of the present disclosure. In-loop filter 500 can be an example of in-loop filter 63 in video encoder 20 of FIG. 2 or in-loop filter 91 in video decoder 30 of FIG. 3. In-loop filter 500 may be configured to process a reconstructed block outputted by summer 62 of FIG. 2 or summer 90 of FIG. 3. The reconstructed block may be a reconstructed version of a video block from a video frame. For example, the reconstructed block may be a reconstructed version of a current video block being encoded by video encoder 20. In-loop filter 500 may include one or more of a deblocking filter 502, an SAO filter 504, and an adaptive loop filter 506.

Deblocking filter 502 may be a video filter applied to the reconstructed block to improve visual quality and prediction performance by smoothing sharp edges formed at boundaries of the reconstructed block. For example, deblocking filter 502 may be configured to modify samples of the reconstructed block located at block boundaries to reduce block artifacts due to block-based coding.

SAO filter 504 may be configured to modify samples of the reconstructed block by conditionally adding an offset value to each sample of the reconstructed block. SAO filter 504 is further described below with reference to an SAO application module 508.

Adaptive loop filter 506 is adaptive in the sense that coefficients of the filter are signaled in the bitstream and can be designed based on image content and distortion of the reconstructed block. Adaptive loop filter 506 may be applied to reduce distortion introduced by the encoding process and improve the quality of the reconstructed block. Adaptive loop filter 506 may include at least one of a luma adaptive loop filter, a Cb-component chroma adaptive loop filter, a Cr-component chroma adaptive loop filter, or a cross-component adaptive loop filter.

In-loop filter 500 may further include SAO application module 508 configured to apply neural network based SAO for video coding. For example, SAO application module 508 may perform a NNLF process on a video frame at a block level. This NNLF process can include any type of neural network structures, and the video frame may include one or more reconstructed blocks. Through the application of the NNLF process, reconstructed samples from the video frame may be converted into NNLF filtered samples (in some cases, with a NNLF on/off flag, NNLF filtering may not be enabled for some of the reconstructed samples). After the NNLF process is performed, SAO application module 508 may perform a neural network (NN) based SAO process on the NNLF filtered samples to generate SAO filtered samples.

As described below in more detail, SAO application module 508 may be configured to: (1) classify reconstructed samples of a reconstructed block into a set of categories based on NNLF; (2) determine a set of offsets for the set of categories based on the classification of the reconstructed samples; and (3) responsive to the NNLF being performed on the reconstructed samples, perform SAO filtering on NNLF filtered samples based on the set of offsets using SAO filter 504. The NNLF filtered samples are generated from the reconstructed samples using the NNLF.

Specifically, SAO application module 508 may be configured to: (1) perform a texture edge classification on the reconstructed samples to classify the reconstructed samples into a set of texture edge categories; (2) determine a set of texture edge offsets for the set of texture edge categories based on the texture edge classification of the reconstructed samples; and (3) responsive to the NNLF being performed on the reconstructed samples, apply the set of texture edge offsets to the NNLF filtered samples based on the texture edge classification of the reconstructed samples using SAO filter 504. The NNLF filtered samples are generated from the reconstructed samples using the NNLF. Alternatively or additionally, SAO application module 508 may be configured to: (1) perform a mean intensity classification on the reconstructed samples to classify the reconstructed samples into a set of mean intensity categories; (2) determine a set of mean intensity offsets for the set of mean intensity categories based on the mean intensity classification of the reconstructed samples; and (3) responsive to the NNLF being performed on the reconstructed samples, apply the set of mean intensity offsets to the NNLF filtered samples based on the mean intensity classification of the reconstructed samples using SAO filter 504, where the NNLF filtered samples are generated from the reconstructed samples using the NNLF.

With respect to the texture edge classification, sample differences before NNLF and after NNLF can be used to classify edge or non-edge samples. Initially, SAO application module 508 may be configured to perform the NNLF on the reconstructed samples to generate NNLF filtered samples. The NNLF can be performed at any granularity level such as a block level or a picture level. Then, for each reconstructed sample, SAO application module 508 may determine a sample difference between the reconstructed sample and a corresponding NNLF filtered sample (e.g., the sample difference=the reconstructed sample-the corresponding NNLF filtered sample). SAO application module 508 may classify the reconstructed sample into a corresponding texture edge category based on a category threshold and the sample difference, as described below in more detail.

In some implementations, the set of texture edge categories may include a first category ("Category 1"), a second category ("Category 2"), and a third category ("Category 3") of texture edge samples. The category threshold may have a threshold value T, with T>0. For each reconstructed sample classified into the first category of texture edge samples, an absolute value of the sample difference between the reconstructed sample and the corresponding filtered sample may be smaller than the positive threshold value (e.g., T). For each reconstructed sample classified into the second category of texture edge samples, the sample difference between the reconstructed sample and the corresponding filtered sample may be equal to or greater than the positive threshold value (e.g., T). For each reconstructed sample classified into the third category of texture edge samples, the sample difference between the reconstructed sample and the corresponding filtered sample may be equal to or greater than the negative threshold value (e.g., −T). It is contemplated that the set of texture edge categories may include any number of categories such as two or more categories, which is not limited herein.

For example, for each reconstructed sample, if an absolute value of the sample difference between the reconstructed sample and the corresponding NNLF filtered sample is smaller than T, SAO application module 508 may classify the reconstructed sample into the first category of texture edge samples. Or, if the sample difference between the reconstructed sample and the corresponding NNLF filtered sample is equal to or greater than T, SAO application module 508 may classify the reconstructed sample into the second category of texture edge samples. Or, if the sample difference between the reconstructed sample and the corresponding NNLF filtered sample is equal to or smaller than −T, SAO application module 508 may classify the reconstructed sample into the third category of texture edge samples.

Next, SAO application module 508 may determine a set of texture edge offsets for the set of texture edge categories based on the texture edge classification of the reconstructed samples. Specifically, for each texture edge category, SAO application module 508 may determine a subset of the reconstructed samples being classified into the texture edge category based on the texture edge classification of the reconstructed samples. SAO application module 508 may also determine a subset of the NNLF filtered samples corresponding to the subset of the reconstructed samples. SAO application module 508 may determine a texture edge offset for the texture edge category based on the subset of the reconstructed samples and the subset of the NNLF filtered samples.

For example, SAO application module 508 may determine a group of candidate offsets from a predetermined offset range (e.g., the predetermined offset range may be in a range between −32 and 31). For each candidate offset in the group, SAO application module 508 may calculate an aggregated distortion between the subset of the reconstructed samples and the subset of the NNLF filtered samples. For example, for each reconstructed sample from the subset of the reconstructed samples, a distortion between the reconstructed sample and a corresponding NNLF filtered sample from the subset of the NNLF filtered samples can be calculated. Consistent with the present disclosure, the distortion can be, for example, a SAD, SSD, a mean squared error (MSE), or any other suitable difference metric. For example, the distortion can be a MSE between the reconstructed sample and the corresponding NNLF filtered sample. Then, a subset of distortions can be calculated for the subset of reconstructed samples, respectively. The aggregated distortion can be a sum of the subset of distortions corresponding to the subset of the reconstructed samples. By performing similar operations for each candidate offset in the group, SAO application module 508 may calculate a group of aggregated distortions for the group of candidate offsets, respectively. SAO application module 508 may select, from the group of candidate offsets, a candidate offset that has a minimum aggregation distortion among the group of aggregation distortions to be the texture edge offset for the category. This minimum aggregation distortion may be referred to as a category distortion associated with the texture edge offset with respect to the threshold value T and the category (denoted as "Dis(T, category)").

By performing similar operations, a set of texture edge offsets for the set of texture edge categories can be determined for the threshold value T. A set of category distortions associated with the set of texture edge offsets can also be determined for the threshold value T.

In some implementations, SAO application module 508 may modify the threshold value T within a predetermined threshold range (e.g., a range of [0, 31]). The modified threshold value may be denoted as T', T'≥0. By performing operations like those described above, SAO application module 508 may reclassify the reconstructed samples into a set of texture edge categories based on the modified threshold value T'. For example, for each reconstructed sample, if an absolute value of the sample difference between the reconstructed sample and the corresponding NNLF filtered sample is smaller than the positive modified threshold value T', SAO application module 508 may classify the reconstructed sample into the first category of texture edge samples. Or, if the sample difference between the reconstructed sample and the corresponding NNLF filtered sample is equal to or greater than the positive modified threshold value T', SAO application module 508 may classify the reconstructed sample into the second category of texture edge samples. Or, if the sample difference between the reconstructed sample and the corresponding NNLF filtered sample is equal to or smaller than the negative modified threshold value (−T'), SAO application module 508 may classify the reconstructed sample into the third category of texture edge samples.

By performing operations like those described above, SAO application module 508 may generate a new set of texture edge offsets for the set of texture edge categories based on the modified threshold value T' and the texture edge reclassification of the reconstructed samples. A new set of category distortions associated with the new set of texture edge offsets can also be determined for the modified threshold value T'.

SAO application module 508 may determine (1) a first aggregated category distortion associated with the threshold value T and (2) a second aggregated category distortion associated with the modified threshold value T'. The first aggregated category distortion can be a sum of the set of category distortions associated with the set of texture edge offsets with respect to the threshold value T. The second aggregated category distortion can be a sum of the new set of category distortions associated with the new set of texture edge offsets with respect to the modified threshold value T'.

For example, Table 1 below illustrates the set of texture edge offsets (V(T, 1), V(T, 2), V(T, 3)) and the set of category distortions (Dis(T, 1), Dis(T, 2), Dis(T, 3)) for the set of categories (Category 1, Category 2, and Category 3) with respect to the threshold value T. Table 1 also illustrates the new set of texture edge offsets (V(T', 1), V(T', 2), V(T', 3)) and the new set of category distortions (Dis(T', 1), Dis(T', 2), Dis(T', 3)) for the set of categories with respect to the modified threshold value T'. The first aggregated category distortion can be calculated as: the first aggregated category distortion=sum(Dis(T, 1), Dis(T, 2), Dis(T, 3)). The second aggregated category distortion can be calculated as: the second aggregated category distortion=sum(Dis(T', 1), Dis(T', 2), Dis(T', 3)).

TABLE 1

|  | Categories | Offset Values | Category Distortions |
| --- | --- | --- | --- |
| Threshold Value T | Category 1 | V(T, 1) | Dis(T, 1) |
|  | Category 2 | V(T, 2) | Dis(T, 2) |
|  | Category 3 | V(T, 3) | Dis(T, 3) |
| Threshold Value T' | Category 1 | V(T', 1) | Dis(T', 1) |
|  | Category 2 | V(T', 2) | Dis(T', 2) |
|  | Category 3 | V(T', 3) | Dis(T', 3) |

SAO application module 508 may determine whether the first aggregated category distortion is greater than the second aggregated category distortion. Responsive to the first aggregated category distortion being greater than the second aggregated category distortion, SAO application module 508 may update the category threshold with the modified threshold value T' and update the set of texture edge offsets with the new set of texture edge offsets. Otherwise, SAO application module 508 may keep the category threshold with the threshold value T and keep the set of texture edge offsets unchanged.

By performing similar operations for a series of possible threshold values within the predetermined threshold range, SAO application module 508 may determine a threshold value for the category threshold and a set of texture edge offsets for the set of texture edge offsets that are associated with the minimum aggregated category distortion.

SAO application module 508 may generate or update a bitstream to include offset related information based on the set of texture edge offsets for the set of texture edge categories. For example, the offset related information may include the threshold value and the set of texture edge offsets for the set of texture edge categories. SAO application module 508 may provide the bitstream to video decoder 30. Upon receiving the bitstream from video encoder 20, video decoder 30 may parse out the threshold value and the set of texture edge offsets from the bitstream. A similar texture edge classification can be performed on reconstructed samples derived on the side of video decoder 30. Similar description will not be repeated herein.

An exemplary texture edge classification process is provided herein. The texture edge classification process may include step (1) of performing NNLF at a predetermined granularity level (e.g., at a picture or block level). For example, the NNLF can be performed on reconstructed samples in a spatial region at the granularity level to generate NNLF filtered samples. The spatial region can be a picture (or video frame) if the granularity level is a picture level, or a reconstructed block if the granularity level is a block level, etc. The spatial region can also be, for example, a CTU or any other flexible region (e.g., a picture can be divided into regions, such as multi-level quadtree partitions).

The texture edge classification process may further include step (2) of calculating a sample difference before NNLF and after NNLF at each sample location of the spatial region. For example, for each reconstructed sample in the spatial region, a sample difference between the reconstructed sample (before NNLF) and a corresponding NNLF filtered sample (after NNLF) can be calculated. As a result, sample differences associated with all the reconstructed samples within the spatial region can be calculated, respectively.

The texture edge classification process may further include step (3) of based on the calculated sample differences associated with the reconstructed samples, classifying the reconstructed samples within the spatial region into a set of texture edge categories. For example, the set of texture edge categories may include three categories such as Category 1, Category 2, and Category 3 described above. Each reconstructed sample within the spatial region can be classified into one of the three categories based on the category threshold and the sample difference of the reconstructed sample by performing operations similar to those described above.

The texture edge classification process may further include step (4) of deriving, by video encoder 20, a texture edge offset for each category. For each category, a subset of the reconstructed samples within the spatial region may be classified into the category. The texture edge offset for the category may be associated with the minimum aggregated distortion of the subset of the reconstructed samples. Specifically, for each reconstructed sample classified into the category, a distortion can be calculated as a MSE between the reconstructed sample and a corresponding NNLF filtered sample. The texture edge offset for the category can be exhaustively searched from a given offset range (e.g., from −32 to 31). For example, the given offset rang may include a group of candidate offsets. For each candidate offset, a distortion at each sample location from the same category can be separately calculated and added together to form an aggregated distortion for the candidate offset, so that a group of aggregated distortions can be calculated for the group of candidate offsets, respectively. Then, a candidate offset that yields the minimum aggregated distortion among the group of aggregated distortions is selected as the texture edge offset for the category. By performing similar operations, a set of texture edge offsets can be determined for the set of texture edge categories. It is noted that when calculating the minimum aggregation distortion, the considered samples are from the same spatial region and also from the same category.

The texture edge classification process may further include step (5) of changing the threshold value of the category threshold within a given threshold range (such as [0, 31]) and repeating steps (3) and (4) until all possible combinations of threshold values and offset values are found. Each threshold value may be associated with a corresponding set of texture edge offsets and a corresponding set of category distortions. A threshold value and a corresponding set of texture edge offsets associated with the minimum aggregated category distortion can be selected as the derived threshold value and the derived set of texture edge offsets for the set of texture edge categories, as described above.

The texture edge classification process may further include step (6) of writing the derived threshold value and the derived set of texture edge offsets for the set of texture edge categories into a bitstream.

The texture edge classification process may further include step (7) of parsing out, on the side of video decoder 30, the threshold value and the set of texture edge offsets from the bitstream. A similar texture edge classification process can be performed on video decoder 30.

With respect to the mean intensity classification, reconstructed samples in a spatial region can be classified into two categories (e.g., a category of NNLF samples and a category of non-NNLF samples). The spatial region can be a region at any suitable granularity level such as a block level or a picture level. For example, the spatial region can be a picture (or video frame), a reconstructed block, a CTU, or any other flexible region (e.g., a picture can be divided into regions, such as multi-level quadtree partitions). The reconstructed samples with NNLF being applied can be classified as NNLF samples, while the reconstructed samples with no NNLF being applied can be classified as non-NNLF samples.

To perform the mean intensity classification, SAO application module 508 may determine whether to perform the NNLF on the spatial region (e.g., a reconstructed block). Responsive to determining to perform the NNLF on the spatial region, SAO application module 508 may classify the reconstructed samples in the spatial region into the category of NNLF samples. Alternatively, responsive to determining not to perform the NNLF on the spatial region, SAO application module 508 may classify the reconstructed samples in the spatial region into the category of non-NNLF samples.

SAO application module 508 may determine a set of mean intensity offsets for the set of mean intensity categories based on the mean intensity classification of the reconstructed samples. For example, responsive to the reconstructed samples in the spatial region being classified into the category of non-NNLF samples, SAO application module 508 may determine a mean intensity offset for the category of non-NNLF samples to be zero. That is, no mean intensity offset is derived for the category of non-NNLF samples, indicating that no mean intensity offset based SAO filtering is performed.

Alternatively, responsive to the reconstructed samples in the spatial region being classified into the category of NNLF samples, SAO application module 508 may perform the NNLF on the reconstructed samples to generate NNLF filtered samples. SAO application module 508 may determine a mean intensity offset for the category of NNLF samples based on the minimum aggregated distortion between the reconstructed samples and the NNLF filtered samples. For example, SAO application module 508 may determine a group of candidate offsets from a predetermined offset range (e.g., the predetermined offset range may be in a range between −32 and 31). For each candidate offset in the group, SAO application module 508 may calculate an aggregated distortion between the reconstructed samples and the NNLF filtered samples. For example, for each reconstructed sample, a distortion between the reconstructed sample and a corresponding NNLF filtered sample can be calculated, so that distortions for all the reconstructed samples can be obtained. The aggregated distortion can be a sum of the distortions for the reconstructed samples. By performing similar operations for each candidate offset in the group, SAO application module 508 may calculate a group of aggregated distortions for the group of candidate offsets, respectively. SAO application module 508 may select, from the group of candidate offsets, a candidate offset that has the minimum aggregation distortion among the group of aggregation distortions to be the mean intensity offset for the category of NNLF samples.

An exemplary mean intensity classification process is provided herein. The mean intensity classification process may include step (1) of determining whether to perform the NNLF in a spatial region. The spatial region can be a region at the picture or block level such as a picture or a block. The mean intensity classification process may include step (2) of classifying each reconstructed sample in the spatial region into one of the two categories (NNLF samples or non-NNLF samples).

For example, an on/off flag may be used to indicate whether the NNLF is applied in the spatial region. The on/off flag can be decided at the encoder side based on a rate distortion optimization algorithm. For example, if a rate distortion of the reconstructed samples in the spatial region when the NNLF is performed is smaller than that when the NNLF is not performed, the on/off flag can be turned on (e.g., the on/off flag is true). Otherwise, the on/off flag can be turned off (e.g., the on/off flag is false). If the on/off flag of the spatial region is true, it indicates that all the reconstructed samples within this spatial region are NNLF samples. Otherwise (if the on/off flag is false), it indicates that all the reconstructed samples in the spatial region are non-NNLF samples.

If the reconstructed samples in the spatial region are classified into the category of NNLF samples, the mean intensity classification process may include step (3) of deriving, by video encoder 20, a mean intensity offset for the category of NNLF samples. The mean intensity offset is associated with the minimum aggregated distortion of the reconstructed samples. For example, by performing operations similar to those described above, SAO application module 508 may calculate a group of aggregated distortions for a group of candidate offsets, respectively. SAO application module 508 may select, from the group of candidate offsets, a candidate offset that has the minimum aggregation distortion among the group of aggregation distortions to be the mean intensity offset for the category of NNLF samples.

In some implementations, the mean intensity offset for the category of NNLF samples can be determined regardless of the on/off flag governed area. For example, each block of the current picture may have a separate on/off flag, but the mean intensity offset may be the same for all the reconstructed samples within the picture that are classified into the category of NNLF samples. That is, even if the reconstructed samples are in different blocks with separate on/off flags, the mean intensity offset is the same for the reconstructed samples as long as the reconstructed samples are in the same picture and classified into the same category of NNLF samples.

On the other hand, if the reconstructed samples in the spatial region are classified into the category of non-NNLF samples, the mean intensity classification process may include step (4) of determining a mean intensity offset for the category of non-NNLF samples to be zero. That is, no mean intensity offset is derived, which indicates that no mean intensity offset based SAO filtering is performed.

Consistent with the present disclosure, the texture edge classification and the mean intensity classification disclosed herein may be combined in any manner. In some implementations, a reconstructed sample may be firstly classified as a NNLF sample or a non-NNLF sample, and then further classified to a respective category of texture edge samples (e.g., as an edge sample or a non-edge sample). Alternatively, a reconstructed sample may be firstly classified into a respective category of texture edge samples, and then further classified as a NNLF sample or a non-NNLF sample. One offset may be derived for one category. If a reconstructed sample belongs to multiple categories, offsets associated with the multiple categories can be applied to a NNLF filtered sample corresponding to this reconstructed sample by an addition operation. For example, for a reconstructed sample that is classified as a NNLF sample and is also classified into the first category of texture edge samples (Category 1), both a mean intensity offset associated with the NNLF sample and a texture edge offset associated with Category 1 can be added to a NNLF filtered sample corresponding to the reconstructed sample when SAO filtering is applied.

Consistent with the present disclosure, the texture edge classification and the mean intensity classification disclosed herein may be performed at any granularity level. In some implementations, the classifications may be performed at a picture level, a CTU level, a block level, or a flexible region level. For a picture-level texture edge classification (or mean intensity classification), reconstructed samples within a picture that are in the same category share the same texture edge offset (or the same mean intensity offset). Similarly, for a CTU-level texture edge classification (or mean intensity classification), reconstructed samples within a CTU that are in the same category share the same texture edge offset (or the same mean intensity offset).

For a flexible-region-level texture edge classification (or mean intensity classification), a picture can be divided into regions, such as multi-level quadtree partitions, and reconstructed samples that are within a respective region and in the same category may share the same texture edge offset (or the same mean intensity offset). Reconstructed samples within different regions that are in the same category may have different texture edge offsets (or different mean intensity offsets), even if the reconstructed samples within the different regions are in the same category.

Consistent with the present disclosure, the texture edge classification and the mean intensity classification disclosed herein are not limited to any specific types of neural network structures. For example, the texture edge classification and the mean intensity classification disclosed herein can be applied for any type of neural network structures. Exemplary neural network structures are illustrated below in FIGS. 9A-10B.

Consistent with the present disclosure, both the texture edge classification and the mean intensity classification disclosed herein may be applied separately for collocated YUV samples. Y samples may include samples of a luminance component. U (blue projection) samples and V (red projection) samples may include samples of two chrominance components, respectively. In this case, offsets including texture edge offsets and mean intensity offsets can be derived separately for collocated YUV samples. Alternatively, only one classification (e.g., the texture edge classification or the mean intensity classification) may be applied for one or two components of the collocated YUV samples. For example, UV samples may be smoother than Y samples, such that texture edge classification is only applied to Y samples, not UV samples.

Consistent with the present disclosure, if the texture edge classification and/or the mean intensity classification disclosed herein are applied, they are performed at both encoder and decoder sides. A corresponding offset for each category may be derived at the encoder side only and written into a bitstream, so that the bitstream is sent to the decoder side. Alternatively, in order to save signaling overhead, the corresponding offset for each category may be derived at both the encoder side and the decoder side by following predefined rules. Exemplary predefined rules are described below in more detail with reference to exemplary signaling reduction methods.

In some implementations, each reconstructed sample from a specific spatial region such as a reconstructed block may be classified into one or more categories from a set of categories. The set of categories may be associated with a set of offsets, respectively. To perform the SAO filtering on the NNLF filtered samples, for each NNLF filtered sample generated from a corresponding reconstructed sample, SAO application module 508 may determine, from the set of categories, one or more categories into which the corresponding reconstructed sample is classified. SAO application module 508 may determine, from the set of offsets, one or more offsets corresponding to the one or more categories from the set of offsets. SAO application module 508 may apply the one or more offsets to the NNLF filtered sample.

For example, the set of categories may include at least one of a set of texture edge categories or a set of mean intensity categories. Correspondingly, the set of offsets may include at least one of a set of texture edge offsets for the set of texture edge categories or a set of mean intensity offsets for the set of mean intensity categories. The corresponding reconstructed sample can be classified into at least one of a texture edge category or a mean intensity category. That is, the corresponding reconstructed sample can be classified into the texture edge category, the mean intensity category, or both the texture edge category and the mean intensity category. SAO application module 508 may apply at least one of a texture edge offset associated with the texture edge category or a mean intensity offset associated with the mean intensity category to the NNLF filtered sample. For example, if a reconstructed sample is only classified into a texture edge category (or mean intensity category), SAO application module 508 may apply a texture edge offset associated with the texture edge category (or a mean intensity offset associated with the mean intensity category) to the NNLF filtered sample corresponding to the reconstructed sample. Alternatively, if the reconstructed sample is classified into both the texture edge category and the mean intensity category, SAO application module 508 may apply both the texture edge offset and the mean intensity offset to the NNLF filtered sample corresponding to the reconstructed sample.

In some implementations, SAO application module 508 may generate or update a bitstream to include offset related information based on at least one of: (1) the set of texture edge offsets for the set of texture edge categories; or (2) the set of mean intensity offsets for the set of mean intensity categories. SAO application module 508 may provide the bitstream to video decoder 30.

In some implementations, the offset related information may include at least one of: (1) a value of the category threshold and the set of texture edge offsets for the set of texture edge categories; (2) a NNLF flag signal (e.g., the on/off flag) indicating whether the NNLF has been performed on the reconstructed block, where the NNLF flag signal may cause video decoder 30 to derive the set of mean intensity offsets for the set of mean intensity categories (as described below in more detail with reference to exemplary signaling reduction methods); or (3) a set of indices for at least one of the set of texture edge offsets or the set of mean intensity offsets, as described below in more detail with reference to the exemplary signaling reduction methods. The set of indices can be generated based on one or more offset mapping tables.

In some implementations, in order to achieve a higher coding efficiency, one or more exemplary signaling reduction methods can be applied to reduce the signaling overhead for the texture edge classification and/or the mean intensity classification disclosed herein. In a first signaling reduction method, a set of mean intensity offsets for the set of mean intensity categories may be derived at the decoder side. For example, when the on/off flag for NNLF is true at the block (or picture) level, (1) a first mean intensity of the whole block (or picture) before the NNLF is applied and (2) a second mean intensity of the whole block (or picture) after the NNLF is applied can be calculated at the decoder side. In this case, a mean intensity difference before and after NNLF can be calculated as a difference between the first mean intensity and the second mean intensity. A mean intensity offset value may be derived based on the mean intensity difference.

For example, a lookup table (e.g., an offset mapping table) may be transmitted in the bitstream to video decoder 30 and used at the decoder side to derive the mean intensity offset value. An exemplary offset mapping table (Table 2) is shown below.

TABLE 2

Mapping Table for Mean Intensity Offset based on Mean Intensity Difference

| Mean Intensity Difference | Offset Value |
|---|---|
| +1 or −1 | 0 |
| +2 | 1 |
| −2 | −1 |
| >+3 | 2 |
| <−3 | −2 |
| ... | ... |

In another example, a linear function may be used to derive the mean intensity offset value. An exemplary linear function is shown below in equation (1):

$$\text{Offset} = \text{Clip}(0, \text{MAX}, a * \text{MeanDiff} + b) \quad (1)$$

In equation (1), "Offset" denotes a derived mean intensity offset value for a current block (or picture), "MeanDiff" denotes a mean intensity difference of the current block (or picture) before and after NNLF, "a" and "b" denote coefficients derived at the encoder side and transmitted in the bitstream. The function "Clip" can be used to constrain the derived mean intensity offset value to be in a range of [0, MAX], where MAX may be a fixed value or a value derived at the encoder side and transmitted in the bitstream.

In this first signaling reduction method, a block-level (or picture-level) flag may be determined at the encoder side. The block-level (or picture-level) flag may be used to evaluate whether the derivation of the mean intensity offset value is enabled or not for the current block (or picture) at the decoder side. For example, video decoder 30 may determine whether to derive the mean intensity offset value a the decoder side for the current block (or current picture) based on the block-level (or picture-level) flag.

In a second signaling reduction method, mean intensity offsets may be avoided at the decoder side. In some implementations, responsive to applying the NNLF on a block (or picture) using a neural network model, the reconstructed samples (before the application of the NNLF) may be preprocessed before inputting into the neural network model. For example, a mean intensity value of a block (or picture) may be shifted before applying the NNLF. After the application of the NNLF on the block (or picture), the shifted mean intensity value can be added back to all the samples for this block (or picture). In this case, training data for the neural network model may be similarly preprocessed to shift the mean intensity value. Examples of the neural network model may include, but are not limited to, a FCNN, a CNN, a long short-term memory network (LSTM), etc.

In a third signaling reduction method, texture edge offsets may be reused for multiple categories. For example, three categories (Category 1, Category 2, Category 3) may be determined for the texture edge classification. In Category 1, an absolute value of a sample difference between a reconstructed sample and a corresponding NNLF filtered sample is below the positive threshold value T. In Category 2, a sample difference between a reconstructed sample and a corresponding NNLF filtered sample is bigger than or equal to the positive threshold value T. In Category 3, a sample difference between a reconstructed sample and a corresponding NNLF filtered sample is smaller than or equal to the negative threshold value −T. A texture edge offset value used for Category 2 and Category 3 may be shared but with a different sign. For example, when the texture edge offset for Category 2 is derived to be x, the texture edge offset used for Category 3 is −x.

In a fourth signaling reduction method, one or more offset mapping tables may be used to reduce signaling bits. For example, the mean intensity offset or the texture edge offset may be indexed using an offset mapping table to generate an offset index. Then, the offset index can be transmitted to the decoder side to save signaling bits. An exemplary offset mapping table (Table 3) is illustrated below, where the actual offset values (e.g., actual mean intensity offset values or actual texture edge offset values) may be consecutive or not consecutive.

TABLE 3

Offset Mapping Table

| Offset Index | Actual Offset |
|---|---|
| 0 | 1 |
| 1 | 9 |
| 2 | 4 |
| 3 | 6 |

Another exemplary offset mapping table (Table 4) is illustrated below, where the actual offset values may be negative or positive.

TABLE 4

Offset Mapping Table

| Offset Index | Actual Offset |
|---|---|
| 0 | −2 |
| 1 | −1 |
| 2 | 0 |
| 3 | 1 |
| 4 | 2 |
| 5 | 3 |
| 6 | 4 |
| 7 | 5 |

In another example, a combined offset mapping table may be used to further reduce signaling bits. An exemplary offset mapping table (Table 5) is illustrated below, where a single index value can be used to retrieve a combination of offset-related parameters (including offset values for different categories, a threshold value, etc.) In Table 5, Offset 1 denotes an offset value for a first category, and Offset 2 denotes an offset value for a second category.

TABLE 5

Offset Mapping Table

| Offset Index | Offset 1 | Offset 2 | Threshold |
|---|---|---|---|
| 0 | 1 | −1 | 5 |
| 1 | 1 | 0 | 5 |
| 2 | 2 | −1 | 7 |
| 3 | 3 | −2 | 7 |

In some implementations, if multiple offset mapping tables are used to generate offset indices, a table-selection index value may be transmitted together with the generated offset index in the bitstream. The table-selection index value may be used to identify which offset mapping table is used to generate the offset index.

Figure 6:
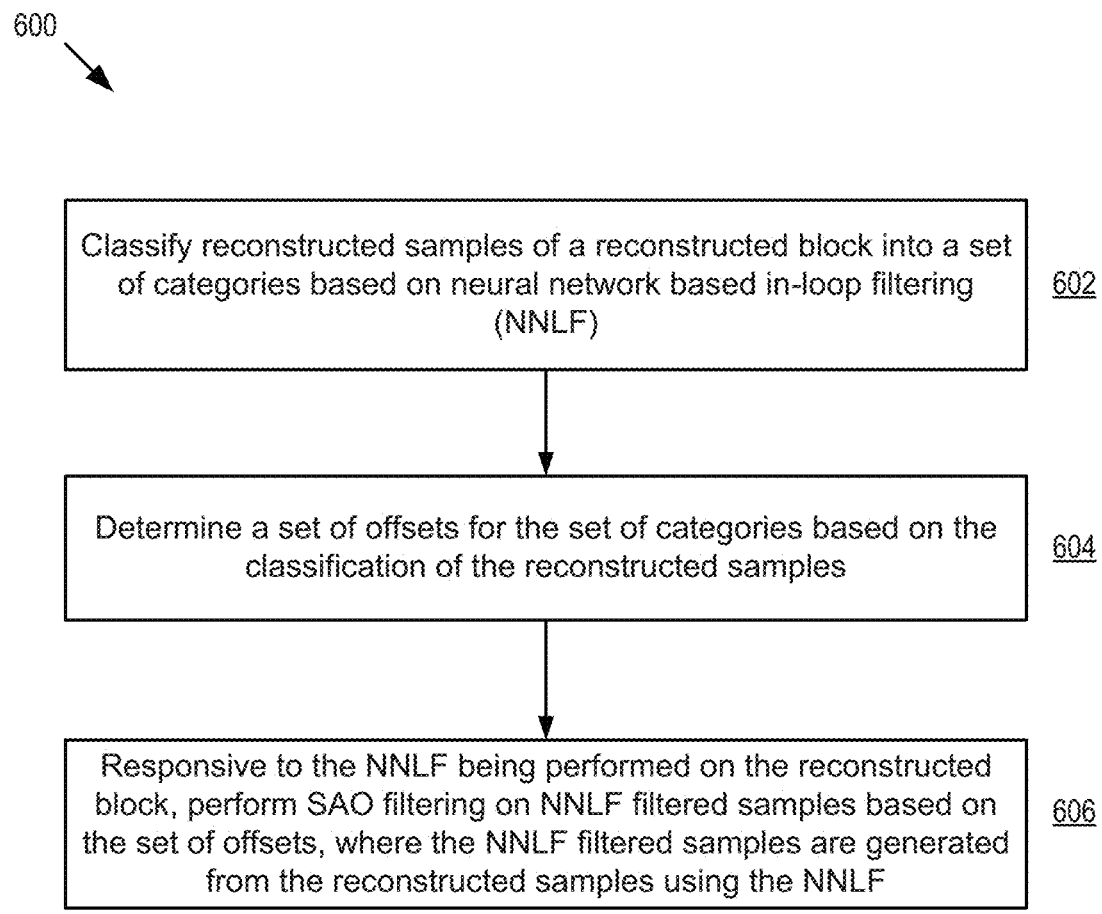
FIG. 6 is a flow chart of an exemplary method for applying neural network based SAO for video coding in accordance with some implementations of the present disclosure.

FIG. 6 is a flow chart of an exemplary method 600 for applying neural network based SAO for video coding, in accordance with some implementations of the present disclosure. Method 600 may be implemented by video encoder 20, specifically SAO application module 508, and may include steps 602-606 as described below. Some of the steps may be optional to perform the disclosure provided herein. Further, some of the steps may be performed simultaneously, or in a different order than shown in FIG. 6.

In step 602, SAO application module 508 may classify reconstructed samples of a reconstructed block into a set of categories based on NNLF. The reconstructed block may include a reconstructed version of a video block of a video frame from a video. For example, SAO application module 508 may perform a texture edge classification on the reconstructed samples to classify the reconstructed samples into a set of texture edge categories. Alternatively or additionally, SAO application module 508 may perform a mean intensity classification on the reconstructed samples to classify the reconstructed samples into a set of mean intensity categories.

In step 604, SAO application module 508 may determine a set of offsets for the set of categories based on the classification of the reconstructed samples. For example, SAO application module 508 may determine a set of texture edge offsets for the set of texture edge categories based on the texture edge classification of the reconstructed samples. Alternatively or additionally, SAO application module 508 may determine a set of mean intensity offsets for the set of mean intensity categories based on the mean intensity classification of the reconstructed samples.

In step 606, SAO application module 508 may perform SAO filtering on NNLF filtered samples based on the set of offsets responsive to the NNLF being performed on the reconstructed block. The NNLF filtered samples are generated from the reconstructed samples using the NNLF. For example, each reconstructed sample may be classified into a texture edge category, a mean intensity category, or both. Correspondingly, SAO application module 508 may apply a texture edge offset associated with the texture edge category, a mean intensity offset associated with the mean intensity category, or both, to a NNLF filtered sample corresponding to the reconstructed sample.

Figure 7:
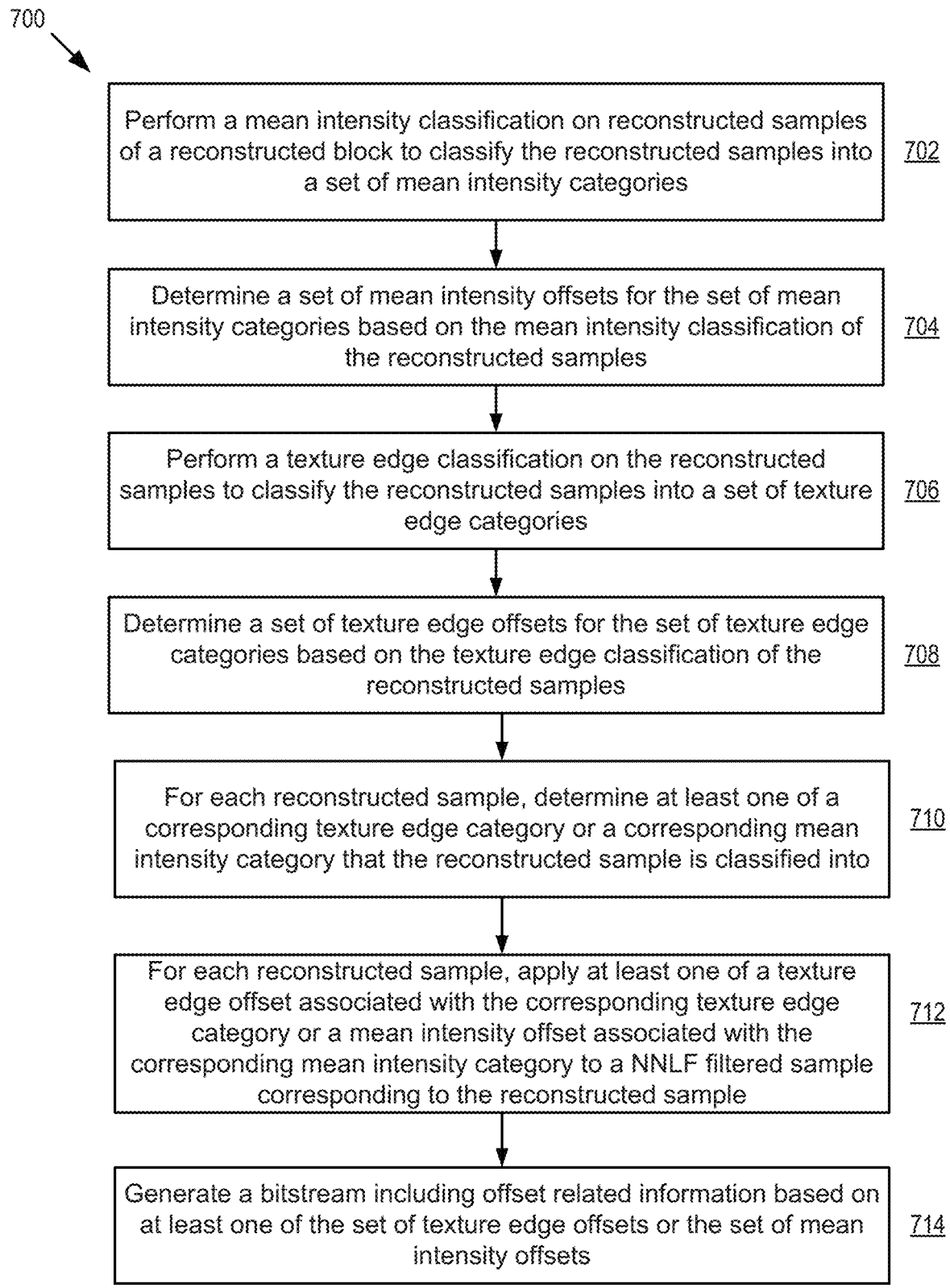
FIG. 7 is a flow chart of another exemplary method for applying neural network based SAO for video coding in accordance with some implementations of the present disclosure.

FIG. 7 is a flow chart of another exemplary method 700 for applying neural network based SAO for video coding, in accordance with some implementations of the present disclosure. Method 700 may be implemented by video encoder 20, specifically SAO application module 508, and may include steps 702-714 as described below. Some of the steps may be optional to perform the disclosure provided herein. Further, some of the steps may be performed simultaneously, or in a different order than shown in FIG. 7.

In step 702, SAO application module 508 may perform a mean intensity classification on reconstructed samples of a reconstructed block to classify the reconstructed samples into a set of mean intensity categories.

In step 704, SAO application module 508 may determine a set of mean intensity offsets for the set of mean intensity categories based on the mean intensity classification of the reconstructed samples.

In step 706, SAO application module 508 may perform a texture edge classification on the reconstructed samples to classify the reconstructed samples into a set of texture edge categories.

In step 708, SAO application module 508 may determine a set of texture edge offsets for the set of texture edge categories based on the texture edge classification of the reconstructed samples.

In step 710, for each reconstructed sample, SAO application module 508 may determine at least one of a corresponding texture edge category or a corresponding mean intensity category that the reconstructed sample is classified into.

In step 712, for each reconstructed sample, SAO application module 508 may apply at least one of a texture edge offset associated with the corresponding texture edge category or a mean intensity offset associated with the corresponding mean intensity category to a NNLF filtered sample corresponding to the reconstructed sample. The NNLF filtered sample may be generated from the reconstructed sample using NNLF. For example, if the reconstructed sample is classified into the corresponding texture edge category only (or the corresponding mean intensity category only), SAO application module 508 may apply the texture edge offset associated with the corresponding texture edge category (or the mean intensity offset associated with the corresponding texture edge category) to the NNLF filtered sample. If the reconstructed sample is classified into both the corresponding texture edge category and the corresponding mean intensity category, SAO application module 508 may apply both the texture edge offset and the mean intensity offset to the NNLF filtered sample.

In step 714, SAO application module 508 may generate a bitstream including offset related information based on at least one of the set of texture edge offsets or the set of mean intensity offsets. The bitstream may be provided to video decoder 30.

For example, the offset related information may include a value of the category threshold and the set of texture edge offsets for the set of texture edge categories. Alternatively or additionally, the offset related information may include a NNLF flag signal indicating that the NNLF has been performed on the reconstructed block. The NNLF flag signal may cause video decoder 30 to derive the set of mean intensity offsets for the set of mean intensity categories. Alternatively or additionally, the offset related information may include a set of indices for at least one of the set of texture edge offsets or the set of mean intensity offsets. The set of indices may be generated based on one or more offset mapping tables. Alternatively or additionally, the offset related information may include the one or more offset mapping tables.

FIG. 8A is a graphical representation illustrating gradient patterns used in SAO, according to some examples. FIG. 8B is a graphical representation illustrating sample edge index categories in SAO edge classes, according to some examples. FIGS. 8A and 8B are described above, and similar description will not be repeated here.

Figure 9A:
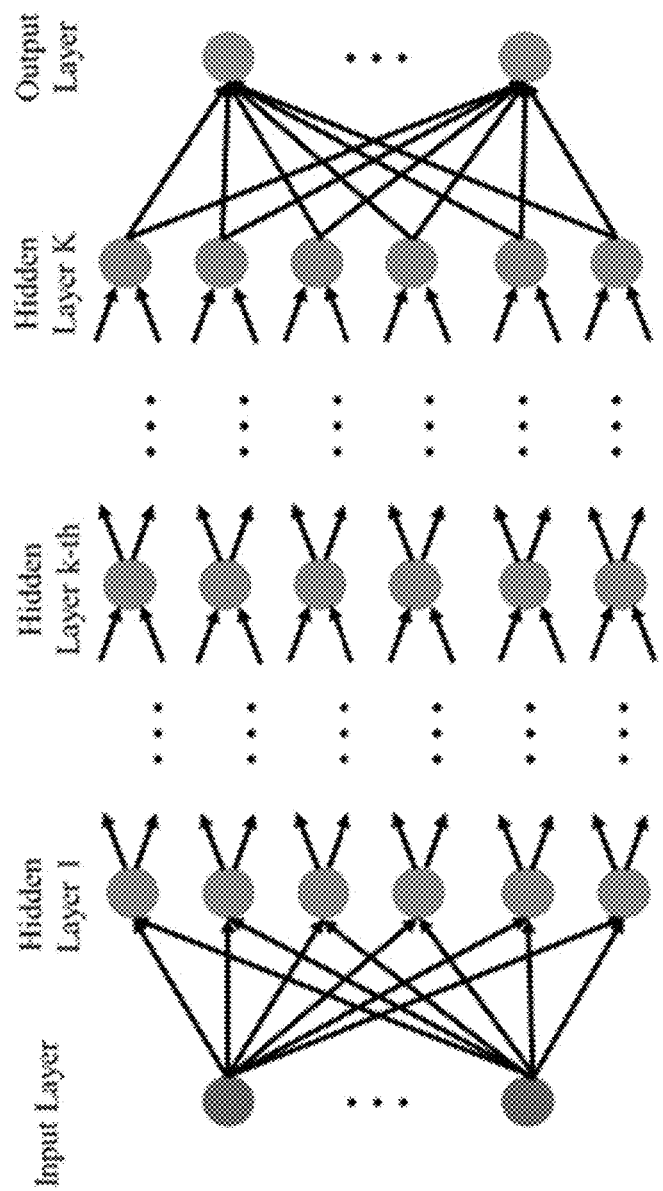
FIG. 9A is a graphical representation illustrating an exemplary fully connected neural network (FCNN) in accordance with some implementations of the present disclosure.

FIG. 9A is a graphical representation illustrating an exemplary FCNN, according to some implementations of the present disclosure. The FCNN may include an input layer, an output layer, and multiple hidden layers. An exemplary FCNN with two hidden layers is illustrated in FIG. 9B.

At a k-th layer of the FCNN, an output $f^k(x^{k-1}, W^k, B^k)$ may be obtained using the following equations (2) and (3):

$$f^k(x^{k-1}, W^k, B^k) = \delta(x^{k-1} * W^k + B^k) \quad (3)$$

$$x^{k-1} * W^k + B^k = [x_1^{k-1}, \ldots, x_j^{k-1}, \ldots,$$

$$[x_M^{k-1}] \cdot \begin{bmatrix} W_{1,1}^k & \cdots & W_{0,N}^k \\ \vdots & \ddots & \vdots \\ W_{M,1}^k & \cdots & W_{M,N}^k \end{bmatrix} + [B_1^{k-1}, \ldots, B_j^{k-1}, \ldots, B_M^{k-1}]$$

In equations (2) and (3), $x^{k-1} \in R^M$ denotes an output of a (k−1)-th layer. $W^k \in R^{M*N}$ and $B^k \in R^N$ denote a weight and a bias at the k-th layer, respectively. $\delta(\cdot)$ denotes an activation function, e.g., the Rectified Linear Unit (ReLU) function as determined by the following equation (4):

$$\delta(x) = \begin{cases} 0, & x < 0 \\ x, & x \geq 0 \end{cases} \quad (4)$$

Therefore, a general form of a FCNN with K layers can be written as:

$$FCNN(x) = f^K(\ldots f^k(f^{k-1}(\ldots f^1(x, W^1, B^1) \ldots), W^k, B^k) \ldots, W^K, B^K), \text{ for } 1 \leq k \leq K \quad (5)$$

According to the universal approximation hypothesis and equation (5), given any continuous function g(x) and some ε>0, there exists a neural network ƒ(x) with a reasonable choice of non-linearity, e.g., ReLU, such that ∀x, |g(x)−ƒ(x)|<ε. Therefore, in a past decade, many empirical studies applied a neural network as an approximator to mimic a model with hidden variables in order to extract explainable features under the surfaces. For example, when applied in image recognition, FCNN can help researchers to construct a system that understands not just a single pixel, but also much deeper and complex sub-structures, e.g., edges, textures, geometric shapes, and/or objects.

Figure 9C:
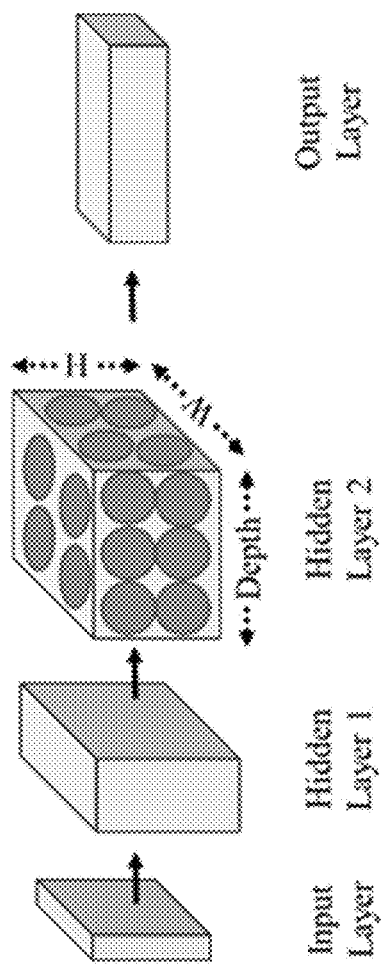
FIG. 9C is a graphical representation illustrating an exemplary convolutional neural network (CNN) in accordance with some implementations of the present disclosure.
Figure 9B:
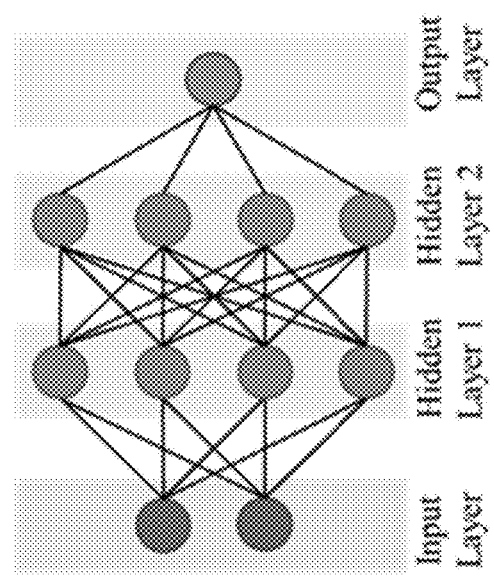
FIG. 9B is a graphical representation illustrating an exemplary FCNN with two hidden layers in accordance with some implementations of the present disclosure.

FIG. 9C is a graphical representation illustrating an exemplary CNN, according to some implementations of the present disclosure. As a popular neural network architecture for image/video applications, the CNN is similar to the FCNN as shown in FIG. 9B, which includes weights and bias matrices. The CNN can be considered as a three-dimensional (3D) neural network. In FIG. 9C, neurons are arranged in a 3D structure (width, height, and depth) to form the CNN with an input layer, a first hidden layer, a second hidden layer, and an output layer. The second hidden layer is visualized in FIG. 9C with a dimension of [W, H, and Depth]. In this example, the input layer holds input images or video frames, and therefore its width and height are the same as the input images or video frames. When applying to image or video applications, each neuron in the CNN is a spatial filter element with an extended depth aligned with its input, e.g., the depth is 3 if there are 3 color components in the input images.

Figure 9D:
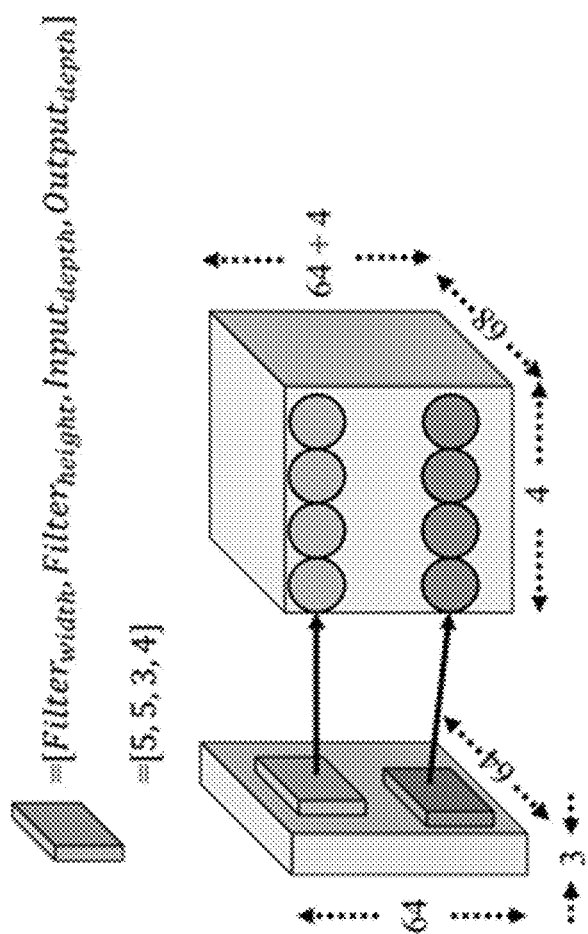
FIG. 9D is a graphical representation illustrating an application of spatial filters to an input image in a CNN in accordance with some implementations of the present disclosure.

An example is shown in FIG. 9D, where the dimension of a basic element in the CNN is determined as [Filter$_{width}$, Filter$_{height}$, Input$_{depth}$, Output$_{depth}$] and set to be [5, 5, 3, 4] in this example. Spatial filters with the dimension [5, 5, 3, 4] are applied with 64×64×3 input images. Two extra pixels are padded for convolutional operations. That is, each spatial filter performs 2-dimensional spatial convolution with 5×5×3 weights on an input image, and then outputs 4 convolutional results. Therefore, the dimension of filtered output results is [64+4, 64+4, 4] when padding the boundary with 2 additional pixels.

Figure 10B:
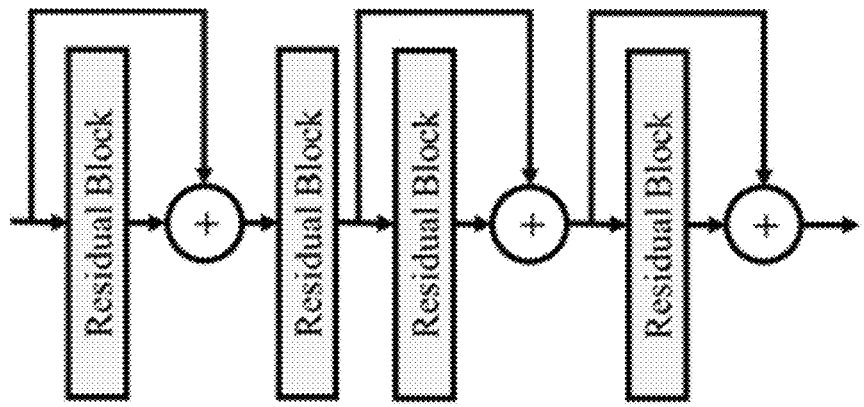
FIGS. 10A and 10B are graphical representations illustrating exemplary residual networks (ResNets) in accordance with some implementations of the present disclosure.
Figure 10A:
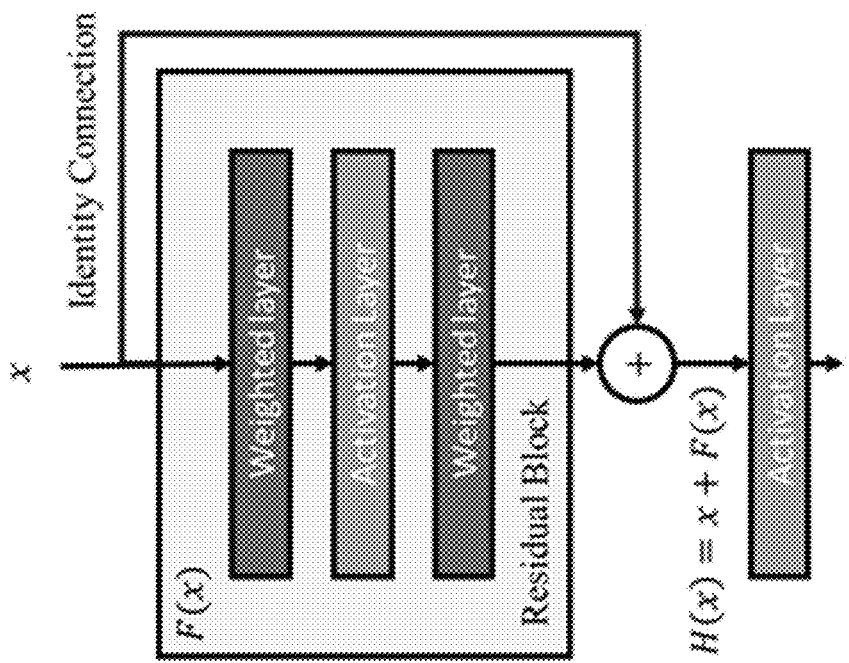

FIGS. 10A and 10B are graphical representations illustrating exemplary residual networks (ResNets), according to some implementations of the present disclosure. It is noted that the accuracy of a neural network may be saturated and degrade rapidly when the depth of the neural network increases. More specifically, adding more layers to a deep neural network may result in a higher training error, because the gradient is gradually vanishing along the deep neural network and heads towards the zero gradient at the end. In this case, a ResNet with residual blocks can resolve this degradation problem by introducing an identity connection.

As shown FIG. 10A, a basic module of ResNet includes a residual block and an identity connection. According to the universal approximation hypothesis, given an input x, weighted layers with an activation function in the residual block approximate a hidden function F(x). Then, an output of the basic module of ResNet can be expressed as H(x)=x+F(x).

By stacking non-linear multi-layer neural networks together, the residual block can explore the features that represent the local characteristics of the input images. Without introducing additional parameters and computational complexity, the identity connection is proven to make deep learning networks trainable by skipping one or more non-linear weighted layers as shown in FIG. 10A. By skipping the weighted layers, the differential output of the basic module of ResNet can be written as:

$$\frac{\partial H(x)}{\partial x} = \frac{\partial F(x)}{\partial x} + 1 \qquad (6)$$

Therefore, even if the differential term $$\frac{\partial F(x)}{\partial x}$$

is gradually decreasing towards zero, the identity term "1" can still carry on and pass the input to a next layer instead of being stuck at the zero gradient and blocking the information propagation. In theory, if a neuron cannot propagate information to a next neuron, it can be considered as a dead neuron, which is a non-trainable element in a neural network.

As shown in FIG. 10A, after adding x and F(x) together to obtain H(x), another non-linear activation function can be applied. In FIG. 10A, the residual block acts as an element of the ResNet, and an output of the residual block is element-wise added with the input of the residual block through the identity connection.

FIG. 10B shows an example of a ResNet formed by stacking residual blocks together. The residual features of a residual block can be fused with the identity features before propagating to a next residual block.

Figure 11:
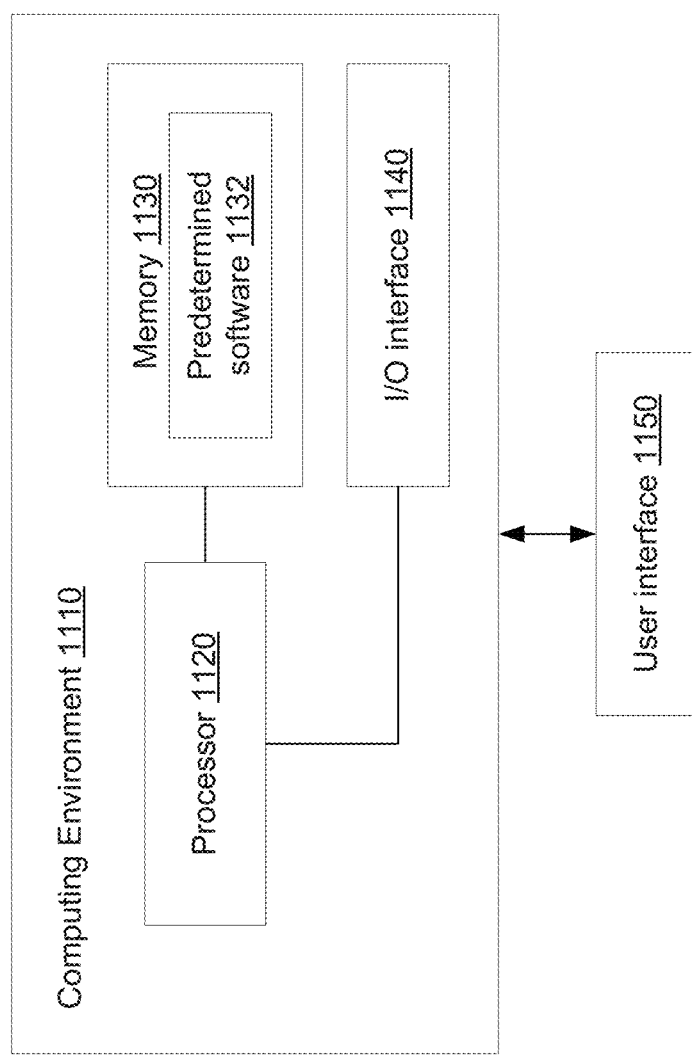
FIG. 11 is a block diagram illustrating a computing environment coupled with a user interface in accordance with some implementations of the present disclosure.

FIG. 11 shows a computing environment 1110 coupled with a user interface 1150, according to some implementations of the present disclosure. The computing environment 1110 can be part of a data processing server. The computing environment 1110 includes a processor 1120, a memory 1130, and an Input/Output (110) interface 1140.

The processor 1120 typically controls overall operations of the computing environment 1110, such as the operations associated with display, data acquisition, data communications, and image processing. The processor 1120 may include one or more processors to execute instructions to perform all or some of the steps in the above-described methods. Moreover, the processor 1120 may include one or more modules that facilitate the interaction between the processor 1120 and other components. The processor 1120 may be a Central Processing Unit (CPU), a microprocessor, a single chip machine, a Graphical Processing Unit (GPU), or the like.

The memory 1130 is configured to store various types of data to support the operation of the computing environment 1110. The memory 1130 may include predetermined software 1132. Examples of such data includes instructions for any applications or methods operated on the computing environment 1110, video datasets, image data, etc. The memory 1130 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The I/O interface 1140 provides an interface between the processor 1120 and peripheral interface modules, such as a keyboard, a click wheel, buttons, or the like. The buttons may include but are not limited to, a home button, a start scan button, and a stop scan button. The I/O interface 1140 can be coupled with an encoder and decoder.

In some implementations, there is also provided a non-transitory computer-readable storage medium comprising a plurality of programs, for example, in the memory 1130, executable by the processor 1120 in the computing environment 1110, for performing the above-described methods. Alternatively, the non-transitory computer-readable storage medium may have stored therein a bitstream or a data stream comprising encoded video information (for example, video information comprising one or more syntax elements) generated by an encoder (for example, video encoder 20 in FIG. 2) using, for example, the encoding method described above for use by a decoder (for example, video decoder 30 in FIG. 3) in decoding video data. The non-transitory computer-readable storage medium may be, for example, a ROM, a Random Access Memory (RAM), a CD-ROM, a magnetic tape, a floppy disc, an optical data storage device or the like.

In some implementations, there is also provided a computing device comprising one or more processors (for example, the processor 1120); and the non-transitory computer-readable storage medium or the memory 1130 having stored therein a plurality of programs executable by the one or more processors, wherein the one or more processors, upon execution of the plurality of programs, are configured to perform the above-described methods.

In some implementations, there is also provided a computer program product comprising a plurality of programs, for example, in the memory 1130, executable by the processor 1120 in the computing environment 1110, for performing the above-described methods. For example, the computer program product may include the non-transitory computer-readable storage medium.

In some implementations, the computing environment 1110 may be implemented with one or more ASICs, DSPs, Digital Signal Processing Devices (DSPDs), Programmable Logic Devices (PLDs), FPGAs, GPUs, controllers, microcontrollers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A computer-implemented method for applying neural network based sample adaptive offset (SAO) for video coding, comprising:
    classifying, by a video processor, reconstructed samples of a reconstructed block into a set of categories based on neural network based in-loop filtering (NNLF), wherein the reconstructed block comprises a reconstructed version of a video block of a video frame from a video;
    determining, by the video processor, a set of offsets for the set of categories based on the classification of the reconstructed samples; and
    responsive to the NNLF being performed on the reconstructed block, performing, by the video processor, SAO filtering on NNLF filtered samples based on the set of offsets, wherein the NNLF filtered samples are generated from the reconstructed samples using the NNLF,
    wherein classifying the reconstructed samples into the set of categories further comprises:
        performing a texture edge classification on the reconstructed samples to classify the reconstructed samples into a set of texture edge categories, and
    wherein performing the texture edge classification on the reconstructed samples to classify the reconstructed samples into the set of texture edge categories comprises:
        performing the NNLF on the reconstructed samples to generate the NNLF filtered samples; and
        classifying each reconstructed sample into a corresponding texture edge category based on a category threshold and a sample difference between the reconstructed sample and a corresponding NNLF filtered sample of the reconstructed sample.

2. The method of claim 1, wherein classifying the reconstructed samples into the set of categories further comprises:
    performing a mean intensity classification on the reconstructed samples to classify the reconstructed samples into a set of mean intensity categories.

3. The method of claim 2, further comprising:
    generating a bitstream comprising offset related information based on at least one of a set of texture edge offsets for the set of texture edge categories or a set of mean intensity offsets for the set of mean intensity categories; and
    providing the bitstream to a video decoder.

4. The method of claim 3, wherein the offset related information comprises at least one of:
    a value of a category threshold and the set of texture edge offsets for the set of texture edge categories;
    a NNLF flag signal indicating that the NNLF has been performed on the reconstructed block, wherein the NNLF flag signal causes the video decoder to derive the set of mean intensity offsets for the set of mean intensity categories; or
    a set of indices for at least one of the set of texture edge offsets or the set of mean intensity offsets, wherein the set of indices is generated based on an offset mapping table.

5. The method of claim 1, wherein the set of texture edge categories comprises a first category, a second category, and a third category of texture edge samples, and classifying each reconstructed sample into the corresponding texture edge category comprises:
    responsive to an absolute value of the sample difference between the reconstructed sample and the corresponding filtered sample being smaller than T, classifying the reconstructed sample into the first category of texture edge samples, wherein T denotes a threshold value of the category threshold which is positive;
    responsive to the sample difference between the reconstructed sample and the corresponding filtered sample being equal to or greater than T, classifying the reconstructed sample into the second category of texture edge samples; or
    responsive to the sample difference between the reconstructed sample and the corresponding filtered sample being equal to or smaller than -T, classifying the reconstructed sample into the third category of texture edge samples.

6. The method of claim 1, wherein determining the set of offsets for the set of categories based on the classification of the reconstructed samples comprises:
    determining a set of texture edge offsets for the set of texture edge categories based on the texture edge classification of the reconstructed samples.

7. The method of claim 6, wherein determining the set of texture edge offsets for the set of texture edge categories based on the texture edge classification of the reconstructed samples comprises:
    for each texture edge category from the set of texture edge categories,
        determining a subset of the reconstructed samples that are classified into the texture edge category;
        determining a subset of the NNLF filtered samples corresponding to the subset of the reconstructed samples; and
        determining a texture edge offset for the texture edge category based on the subset of the reconstructed samples and the subset of the NNLF filtered samples.

8. The method of claim 7, wherein determining the texture edge offset for the texture edge category comprises:
    determining a group of candidate offsets from a predetermined offset range;
    for each candidate offset, calculating an aggregated distortion between the subset of the reconstructed samples and the subset of the NNLF filtered samples, so that a group of aggregated distortions are calculated for the group of candidate offsets, respectively; and
    selecting, from the group of candidate offsets, a candidate offset that has a minimum aggregation distortion among the group of aggregation distortions to be the texture edge offset for the texture edge category.

9. The method of claim 6, further comprising:
    modifying a threshold value of the category threshold within a predetermined threshold range;
    reclassifying the reconstructed samples into the set of texture edge categories based on the modified threshold value; and
    generating a new set of texture edge offsets for the set of texture edge categories based on the modified threshold value and the reclassification of the reconstructed samples.

10. The method of claim 9, further comprising:
    determining whether a first aggregated category distortion associated with the threshold value is greater than a second aggregated category distortion associated with the modified threshold value; and responsive to the first aggregated category distortion being greater than the second aggregated category distortion,
updating the threshold value with the modified threshold value; and
updating the set of texture edge offsets with the new set of texture edge offsets.

11. The method of claim 2, wherein the set of mean intensity categories comprises a category of NNLF samples and a category of non-NNLF samples, and performing the mean intensity classification on the reconstructed samples to classify the reconstructed samples into the set of mean intensity categories comprises:
determining whether to perform the NNLF on the reconstructed block;
responsive to determining to perform the NNLF on the reconstructed block, classifying the reconstructed samples into the category of NNLF samples; or
responsive to determining not to perform the NNLF on the reconstructed block, classifying the reconstructed samples into the category of non-NNLF samples.

12. The method of claim 11, wherein determining the set of offsets for the set of categories based on the classification of the reconstructed samples comprises:
determining a set of mean intensity offsets for the set of mean intensity categories based on the mean intensity classification of the reconstructed samples.

13. The method of claim 12, wherein determining the set of mean intensity offsets for the set of mean intensity categories based on the mean intensity classification of the reconstructed samples comprises:
responsive to the reconstructed samples being classified into the category of non-NNLF samples, determining a mean intensity offset for the category of non-NNLF samples to be zero; or
responsive to the reconstructed samples being classified into the category of NNLF samples,
performing the NNLF on the reconstructed samples to generate the NNLF filtered samples; and
determining a mean intensity offset for the category of NNLF samples based on a minimum aggregated distortion between the reconstructed samples and the NNLF filtered samples.

14. The method of claim 1, wherein performing the SAO filtering on the NNLF filtered samples based on the set of offsets comprises:
for each NNLF filtered sample generated from a corresponding reconstructed sample,
determining, from the set of categories, one or more categories into which the corresponding reconstructed sample is classified;
determining, from the set of offsets, one or more offsets corresponding to the one or more categories; and
applying the one or more offsets to the NNLF filtered sample.

15. The method of claim 14, wherein:
the set of categories comprises at least one of the set of texture edge categories or a set of mean intensity categories;
the set of offsets comprises at least one of a set of texture edge offsets for the set of texture edge categories or a set of mean intensity offsets for the set of mean intensity categories;
the corresponding reconstructed sample is classified into at least one of a texture edge category or a mean intensity category; and applying the one or more offsets to the NNLF filtered sample comprises applying at least one of a texture edge offset associated with the texture edge category or a mean intensity offset associated with the mean intensity category to the NNLF filtered sample.

16. A system for applying neural network based sample adaptive offset (SAO) for video coding, comprising:
a memory configured to store at least one video frame of a video, the video frame comprising at least one video block; and
a video processor configured to:
classify reconstructed samples of a reconstructed block into a set of categories based on neural network based in-loop filtering (NNLF), wherein the reconstructed block comprises a reconstructed version of the video block;
determine a set of offsets for the set of categories based on the classification of the reconstructed samples; and
responsive to the NNLF being performed on the reconstructed block, perform SAO filtering on the NNLF filtered samples based on the set of offsets, wherein the NNLF filtered samples are generated from the reconstructed samples using the NNLF,
wherein to classify the reconstructed samples into the set of categories, the video processor is further configured to:
perform a texture edge classification on the reconstructed samples to classify the reconstructed samples into a set of texture edge categories, and
wherein to perform the texture edge classification on the reconstructed samples to classify the reconstructed samples into the set of texture edge categories, the video processor is further configured to:
perform the NNLF on the reconstructed samples to generate the NNLF filtered samples; and
classify each reconstructed sample into a corresponding texture edge category based on a category threshold and a sample difference between the reconstructed sample and a corresponding NNLF filtered sample of the reconstructed sample.

17. The system of claim 16, wherein to classify the reconstructed samples into the set of categories, the video processor is further configured to:
perform a mean intensity classification on the reconstructed samples to classify the reconstructed samples into a set of mean intensity categories.

18. A non-transitory computer-readable storage medium having stored therein instructions which, when executed by a video processor, cause the video processor to perform a method for applying neural network based sample adaptive offset (SAO) for video coding, the method comprising:
classifying reconstructed samples of a reconstructed block into a set of categories based on neural network based in-loop filtering (NNLF), wherein the reconstructed block comprises a reconstructed version of a video block of a video frame from a video;
determining a set of offsets for the set of categories based on the classification of the reconstructed samples;
responsive to the NNLF being performed on the reconstructed block, performing SAO filtering on NNLF filtered samples based on the set of offsets, wherein the NNLF filtered samples are generated from the reconstructed samples using the NNLF; and
generating a bitstream comprising offset related information based on the set of offsets for the set of categories, wherein classifying the reconstructed samples into the set of categories further comprises:
  performing a texture edge classification on the reconstructed samples to classify the reconstructed samples into a set of texture edge categories,
wherein performing the texture edge classification on the reconstructed samples to classify the reconstructed samples into the set of texture edge categories comprises:
  performing the NNLF on the reconstructed samples to generate the NNLF filtered samples; and classifying each reconstructed sample into a corresponding texture edge category based on a category threshold and a sample difference between the reconstructed sample and a corresponding NNLF filtered sample of the reconstructed sample, and
wherein the bitstream is stored in the non-transitory computer-readable storage medium.

* * * * *